(12) United States Patent
Soler Brullet et al.

(10) Patent No.: US 12,251,290 B2
(45) Date of Patent: Mar. 18, 2025

(54) ASSEMBLY FOR FORMING AN INTERFACE PART FOR DENTAL IMPLANTS WITH VARIABLE HEIGHT

(71) Applicant: Implant Protesis Dental 2004 S.L., Mataro (ES)

(72) Inventors: Carlos Soler Brullet, Mataro (ES); Juan Carlos Pérez Yanini, Mataro (ES)

(73) Assignee: IMPLANT PROTESIS DENTAL 2004 S.L., Mataro (ES)

( * ) Notice: Subject to any disclaimer, the term of this patent is extended or adjusted under 35 U.S.C. 154(b) by 1114 days.

(21) Appl. No.: 16/972,257

(22) PCT Filed: May 29, 2019

(86) PCT No.: PCT/ES2019/070357
§ 371 (c)(1),
(2) Date: Dec. 4, 2020

(87) PCT Pub. No.: WO2019/234269
PCT Pub. Date: Dec. 12, 2019

(65) Prior Publication Data
US 2021/0153983 A1    May 27, 2021

(30) Foreign Application Priority Data

Jun. 4, 2018  (ES) ................ ES201830537
Jul. 6, 2018   (ES) ................ ES201830679

(51) Int. Cl.
*A61C 8/00*    (2006.01)

(52) U.S. Cl.
CPC .......... *A61C 8/0068* (2013.01); *A61C 8/0059* (2013.01); *A61C 8/0069* (2013.01); *A61C 8/0089* (2013.01)

(58) Field of Classification Search
CPC ... A61C 8/0068; A61C 8/0059; A61C 8/0069; A61C 8/005; A61C 8/0063; A61C 8/0001
See application file for complete search history.

(56) References Cited

U.S. PATENT DOCUMENTS

| 4,758,161 A | 7/1988 | Niznick |
| 5,125,839 A | 6/1992 | Ingber et al. |
| (Continued) | | |

FOREIGN PATENT DOCUMENTS

| ES | 1184883 U    | 6/2017 |
| WO | 2012074144 A1 | 6/2012 |
| WO | 2015189648 A2 | 12/2015 |

OTHER PUBLICATIONS

International Search Report from corresponding International Application No. PCT/ES2019/070357 mailed on Mar. 19, 2020.
(Continued)

*Primary Examiner* — Ralph A Lewis
(74) *Attorney, Agent, or Firm* — Tucker Ellis LLP

(57) ABSTRACT

The present invention relates to an assembly for forming an interface part for dental implants with variable height. The assembly comprises a tubular interface part with a central axis and an auxiliary part which is coupled to the interface part. In a coupled position: the auxiliary part is integral with the interface part at least in a sense of direction parallel to the central axis; a final segment of the abutment protrudes through an upper end of the auxiliary part; and a peripheral surface outside the abutment comprises at least one planar face in a plane which intersects with the final segment of the abutment and the central axis. The planar face of the auxiliary part serves as a guide for cutting the abutment at a specific height.

2 Claims, 15 Drawing Sheets

(56) References Cited

U.S. PATENT DOCUMENTS

| | | | |
|---|---|---|---|
| 5,316,477 A * | 5/1994 | Calderon | A61C 8/005 433/172 |
| 5,334,024 A * | 8/1994 | Niznick | A61C 8/0001 433/172 |
| 5,527,182 A | 6/1996 | Willoughby | |
| 6,012,923 A * | 1/2000 | Bassett | A61C 8/005 433/172 |
| 6,527,553 B2 * | 3/2003 | Yeung | A61C 8/005 433/173 |
| 6,644,970 B1 * | 11/2003 | Lin | A61C 8/008 433/173 |
| 6,758,672 B2 * | 7/2004 | Porter | A61C 8/005 433/213 |
| 7,204,692 B2 * | 4/2007 | Klardie | A61C 8/0001 433/173 |
| 8,113,835 B2 * | 2/2012 | Yau | A61C 8/0062 433/173 |
| 8,545,222 B2 * | 10/2013 | Wang | A61C 8/005 433/173 |
| 2003/0082498 A1 | 5/2003 | Halldin et al. | |
| 2004/0043360 A1 * | 3/2004 | Obata | A61C 8/005 433/173 |
| 2007/0059666 A1 * | 3/2007 | Zickman | A61C 8/0066 433/173 |
| 2008/0206709 A1 * | 8/2008 | Lannan | A61C 8/005 433/172 |
| 2011/0151397 A1 | 6/2011 | Seo et al. | |
| 2011/0171603 A1 | 7/2011 | Kim | |
| 2016/0367341 A1 | 12/2016 | Perez Yanini | |
| 2017/0196663 A1 | 7/2017 | Karmon | |
| 2017/0312059 A1 | 11/2017 | Burger | |
| 2018/0368956 A1 * | 12/2018 | Fisker | G06F 30/00 |

OTHER PUBLICATIONS

Search Report from corresponding Spanish Application No. 201830537 completed on Oct. 23, 2018.

Search Report from corresponding Spanish Application No. 201830679 completed on Oct. 30, 2018.

* cited by examiner

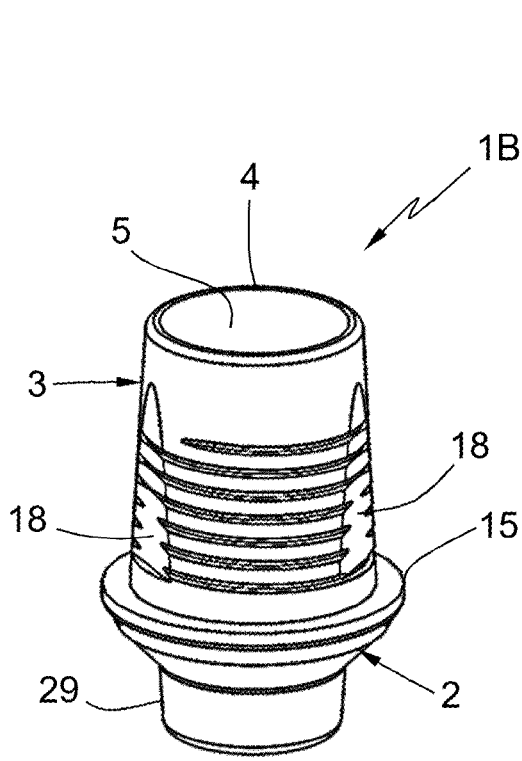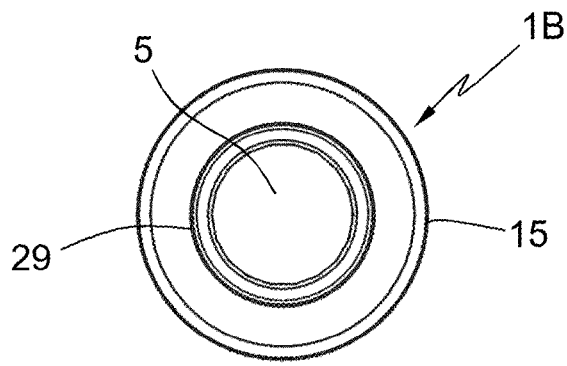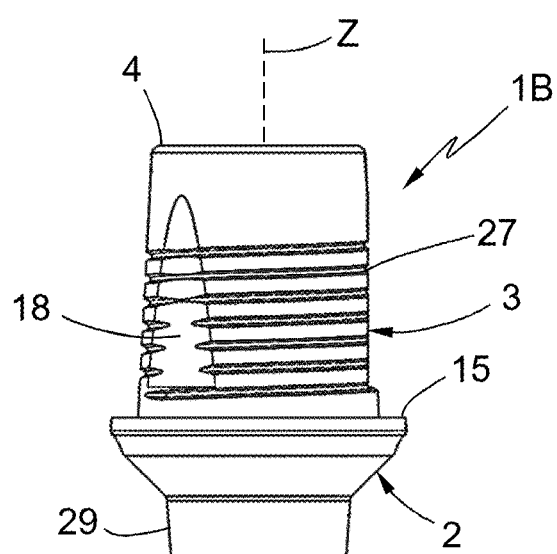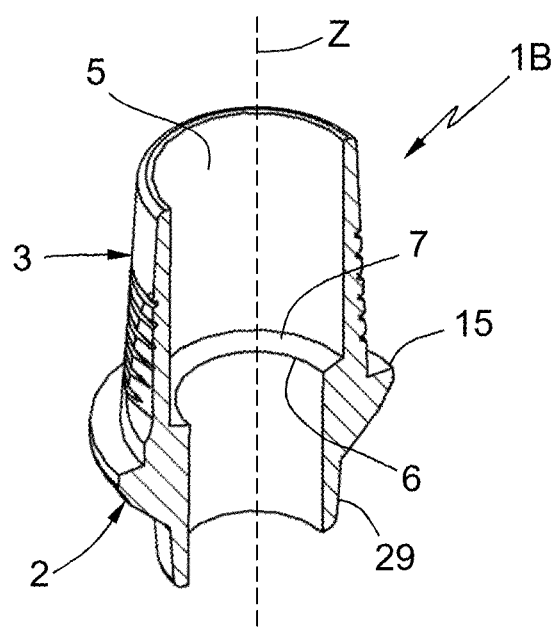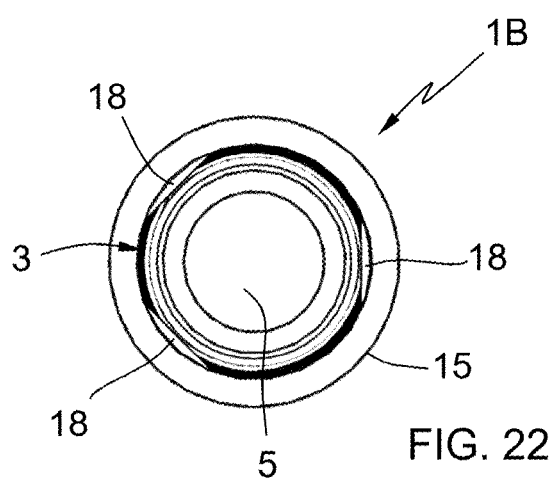
FIG. 18
FIG. 20
FIG. 21
FIG. 19
FIG. 22

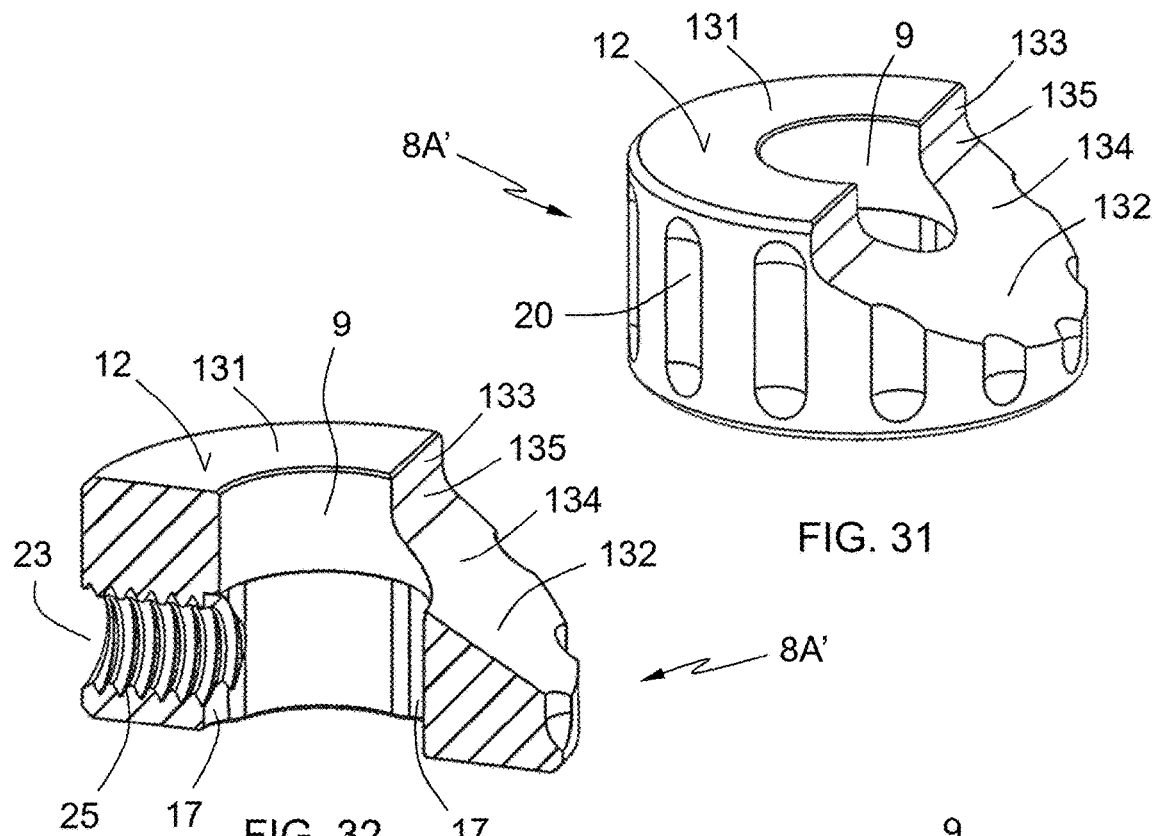
FIG. 31
FIG. 32
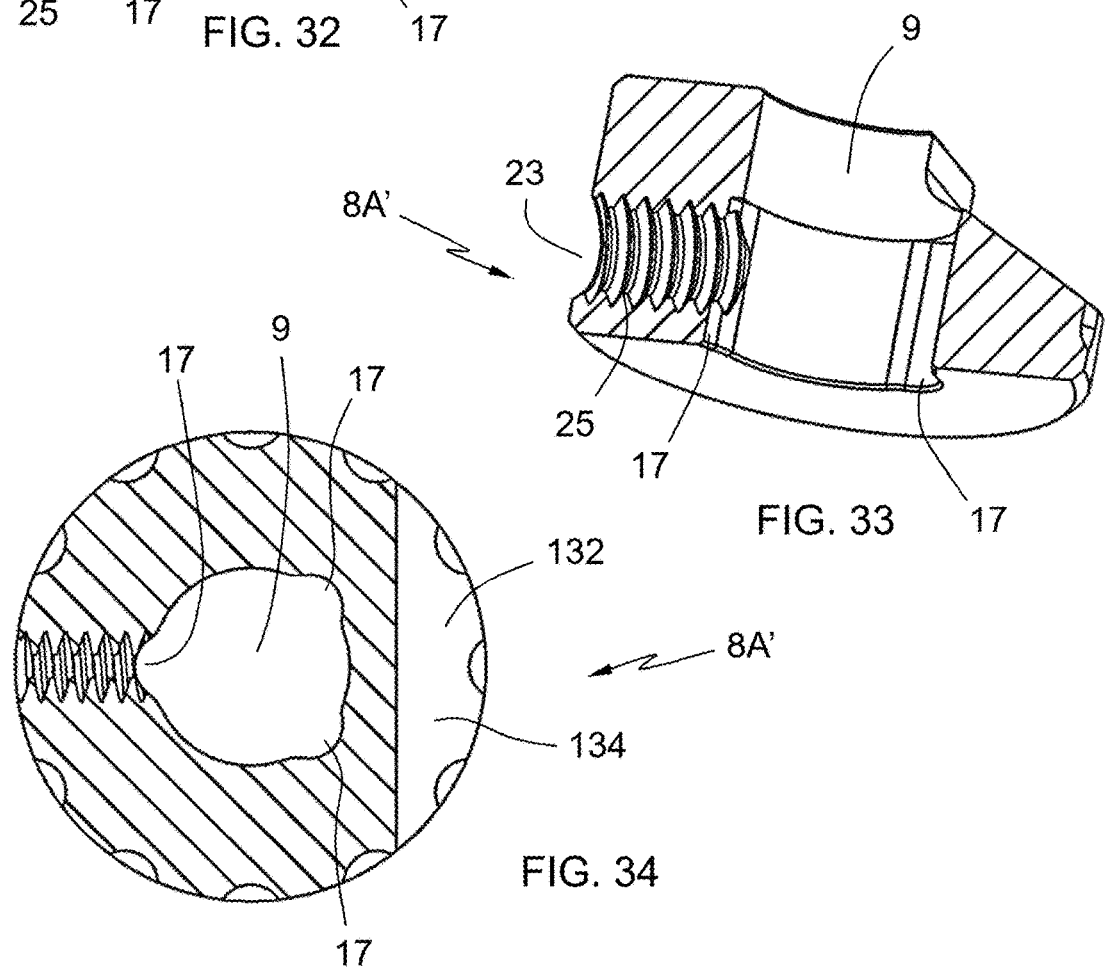
FIG. 33
FIG. 34

ASSEMBLY FOR FORMING AN INTERFACE PART FOR DENTAL IMPLANTS WITH VARIABLE HEIGHT

RELATED APPLICATION DATA

This application is a national phase application of International Application No. PCT/ES2019/070357 filed May 29, 2019, which claims priority to application number P201830537 filed Jun. 4, 2018 and application number P201830679 filed Jul. 6, 2018. The entireties of the aforementioned applications are incorporated herein by reference.

FIELD OF THE INVENTION

The invention is comprised in the field of dental implants.

The dental implants to which the invention is applied comprise a dental implant body which is implanted in the bone of a patient by means of a surgical operation, and a dental prosthesis which is fixed to this dental implant body by means of screwing, using a screw which is threaded into a threaded hole provided for such purpose in the dental implant body. The dental prosthesis can also be fixed to an analog during the phase of constructing said prosthesis in the laboratory. An analog is a support which has a geometry similar to that of the connection of the dental implant body and in which the dental implant structure is fixed so that it can be worked on in the laboratory.

This dental prosthesis which is fixed to the dental implant body by means of a screw is a complex element that is custom made in a laboratory and comprises a prosthesis element, such as for example, a castable body or a prosthetic tooth body, and an interface part which is interposed between said prosthesis element and the dental implant body. This interface part protects the dental implant body from abrasion caused by the ceramic material forming the dental prosthesis, and also facilitates fitting the dental prosthesis on the dental implant body.

The invention relates to this interface part intended for being interposed between the prosthesis element and the dental implant body.

More specifically, the invention consists of an assembly which allows providing an interface part with variable height.

STATE OF THE ART

The invention relates to interface parts having a tubular shape, with a base end intended for seating the interface part on a dental implant body, a pillar for integrally attaching a prosthesis element (for example, a castable body or a prosthetic tooth body) to the interface part, and an inner conduit going through the interface part forming a passage for a set screw, said inner conduit being provided with an inner rib which forms a seating for the head of the set screw. The base end can have different shapes, each of them adapted to a corresponding shape of the dental implant body. The pillar can have a cylindrical shape, frustoconical shape, or another type depending on the type of dental prosthesis to be constructed.

In the known state of the art, the interface parts are supplied with a pillar having a fixed height. This height of the pillar is not always the most suitable according to the type and dimensions of the dental prosthesis to be constructed. Document ES1182233U discloses a solution for a dental prosthesis technician to modify the height of the pillar of the interface part. This solution consists of providing markings along the pillar to indicate to the dental prosthesis technician several possible positions for cutting the pillar and thereby reducing its height. The dental prosthesis technician uses their own machining implements for cutting the pillar at one of the heights indicated by the markings. Performing a precise cutting operation is not an easy task, taking into account that an interface part has very small dimensions and that the dental prosthesis technician must choose one of the markings present in the interface part itself and make a cut at the height indicated by the chosen marking. Moreover, to enable the dental prosthesis technician to distinguish the markings, they must be arranged in a cleared area of the pillar wall, which in many cases requires modifying the pillar to provide it with these cleared areas. In particular, these cleared areas must be devoid of retaining grooves that are usually formed on the outer surface of the pillar, which can weaken the retention of the prosthesis element on the surface of the pillar.

Moreover, there is a need to provide interface parts having a notch at the free end of the pillar for certain applications. This is particularly the case for interface parts intended for making angled dental prostheses in which the notch of the interface part allows introducing the set screw a with an inclination with respect to the central axis, and likewise allows introducing a screwing tool also with an inclination.

DESCRIPTION OF THE INVENTION

The purpose of the invention is to provide an assembly for forming an interface part for dental implants with variable height, which assembly allows a dental prosthesis technician to reduce the height of the pillar in an easier manner and with greater precision, and without having to modify the pillar to provide it with special markings.

This purpose is achieved by means of an assembly for forming an interface part for dental implants with variable height, characterized in that it comprises:

an interface part having a tubular shape with a central axis and comprising: a base end for seating said interface part on a dental implant body, a pillar for integrally attaching a prosthesis element to said interface part, said pillar being coaxial with said central axis and extending from said base end to a free end of said pillar, and an inner conduit coaxial with said central axis going through said interface part from said free end to said base end forming a passage for a set screw, said inner conduit being provided with an inner rib which forms a seating for the head of the set screw, and at least one auxiliary part formed for being coupled in a detachable manner to said interface part, such that in a coupled position: said auxiliary part is coupled said interface part so that it cannot move relatively to said interface part at least in a sense of direction parallel to said central axis; a final segment of said pillar, adjacent to said free end, protrudes through an upper end of said auxiliary part; said upper end of the auxiliary part forms a peripheral surface outside said pillar, said peripheral surface comprising at least one planar face in a plane; and said plane of the planar face intersects with said final segment of the pillar and said central axis.

The assembly according to the invention does not require modifying the interface part to provide it with markings indicating cutting heights. In contrast, the invention is based on associating, with the interface part, an auxiliary part having a specific shape for being coupled to the interface part, such that when both parts are coupled to one another the auxiliary part provides a planar face precisely defining a cutting plane for cutting the pillar at a specific height which is predetermined by the actual dimensions of the auxiliary part. In other words, instead of supplying the dental prosthesis technician with an interface part with markings that the technician must cut using their own means following said markings, an assembly formed by the interface part and the auxiliary part is supplied thereto. Therefore, the technician does not have to identify a marking in an interface part which has very small dimensions, nor do they have to align a cutting system with the marking in the interface part. The technician only has to choose the auxiliary part, couple it to the interface part, and cut the pillar along the plane defined by the planar face at the upper end of the auxiliary part. To make the cut, the technician can use a conventional cutting tool, such as a drill or a cutting disc, for example, and guide said cutting tool using the planar face of the auxiliary part as a support. Good cutting precision is thereby achieved and the need for each dental prosthesis technician to implement a particular cutting system which can give different results depending on the technician's skills is prevented. Once cutting has been performed, the technician removes the auxiliary part as it can be detached from its coupling with the interface part.

In preferred embodiments, the auxiliary part has an annular shape with an axial passage, said axial passage going through said auxiliary part from a lower end to the upper end forming the peripheral surface. The peripheral surface is therefore an annular surface around said axial passage. The auxiliary part is formed such that the pillar enters the axial passage of the auxiliary part through the lower end and moves freely in a direction parallel to the central axis to the coupled position. In said coupled position, the interface part is coupled to the auxiliary part by shape complementarity between said interface part and said auxiliary part, so that it cannot move relatively to said auxiliary part in any radial direction with respect to the central axis. This configuration allows the dental prosthesis technician to readily couple the two parts in a detachable manner and likewise cut the pillar in a particularly reliable manner.

Preferably, in these last embodiments the auxiliary part has a cylindrical-shaped outer surface provided with grooves distributed along the circular perimeter of said cylindrical shape. This outer surface can be used like a grip, so that the dental prosthesis technician can hold the auxiliary part with their hand or with a tool.

Preferably, the assembly according to the invention comprises a plurality of said auxiliary parts, each of them being sized such that, in the coupled position, the plane of the planar face intersects with the final segment of the pillar and the central axis at a different height along said central axis. As a result, the dental prosthesis technician no longer has to distinguish between different markings in the interface part, but rather simply choose, from among the different auxiliary parts of the assembly, the one which corresponds to the desired cutting height. Each auxiliary part can have an indication, such as an alphanumerical text or a color code, for example, indicating its cutting height. This indication can be placed on the outer surface of the auxiliary part, whereby it can be large enough for the dental prosthesis technician to recognize same with the naked eye.

In preferred embodiments, the base end of the interface part comprises a rim protruding from the outer surface of the pillar in a radial direction with respect to the central axis, and the pillar extends from said rim to the free end. In the coupled position, the auxiliary part is supported with its lower end abutting with said rim in the direction of the central axis. In this configuration of the interface part which is the most common in the state of the art, the rim is intended for being supported on the body of the dental implant. The particularity of these embodiments of the invention consists of advantageously using this rim as a stop for the auxiliary part.

Preferably, the pillar of the interface part comprises a non-circular outer surface with respect to the central axis, and the auxiliary part comprises a non-circular inner surface with respect to said central axis, said non-circular inner surface having a shape complementary to the shape of said non-circular outer surface, such that in the coupled position, the interface part is coupled to the auxiliary part by shape complementarity between said outer surface and said inner surface, so that said interface part cannot rotate relatively to said auxiliary part with respect to said central axis. Relative rotation between the two parts during the pillar cutting operation which, in some cases, may damage the interface part, is thereby prevented.

In some embodiments, the pillar comprises, in a lower segment of said pillar adjacent to the base end, at least one protuberance forming the non-circular outer surface of the pillar, and the inner surface of the auxiliary part comprises at least one sinkage which forms the non-circular inner surface of said auxiliary part and in which said protuberance is introduced in the coupled position. This solution has the advantage of leaving the entire upper segment of the pillar, which is preferably provided with retaining grooves and intended for integrally attaching the prosthesis element to the interface part, free.

Preferably, said protuberances are at least three in number and distributed around the central axis. This allows the dental prosthesis technician to more readily couple the auxiliary part to the interface part.

In other embodiments, the outer surface of the pillar comprises at least one recess forming the non-circular outer surface of the pillar, and the inner surface of the auxiliary part comprises at least one rib which forms the non-circular inner surface of said auxiliary part and is introduced in said recess in the coupled position. This shape of the pillar allows rotatably coupling a prosthesis element to said pillar.

Preferably, said recesses are at least three in number and distributed around the central axis. Like in the preceding case, this allows the dental prosthesis technician to more readily couple the auxiliary part to the interface part.

Preferably, in these last embodiments the outer surface of the pillar has a frustoconical shape with a diameter decreasing towards the free end.

Optionally, the assembly according to the invention comprises a tool for attaching the auxiliary part to the interface part, in the coupled position, so that it cannot move relatively to said interface part in the direction of the central axis, said tool comprising a rod which moves in a through hole of said auxiliary part and presses, with its end, the outer surface of said interface part. As a result of this solution, the technician does not have to maintain the coupled position of the two parts during the dental prosthesis cutting operation, so the pillar cutting operation is made even easier.

Preferably, the rod is provided with a thread and the through hole is provided with a corresponding thread, such that said rod is screwed into said through hole so that it moves along same until pressing, with its end, the outer surface of the interface part, and the tool comprises a handle integral with said rod. This configuration allows attaching the parts, so that they cannot move one relatively to the other, in a particularly easy and robust manner.

In some embodiments having the purpose of forming an interface part that has a variable height and is suitable for angled prostheses in which the pillar has a notch at its free end, the assembly according to the invention is characterized in that the peripheral surface of the interface part comprises a first planar face in a first plane which intersects with the final segment of the pillar and the central axis, and a second face that does not belong to said first plane and continuously prolongs said first planar face in said peripheral surface.

In addition to the aforementioned advantages of the assembly according to the invention, these embodiments allow the technician to make a notch at the end of the pillar very easily. To that end, the technician only has to complete the cutting of the pillar by following the second face of the peripheral surface with a cutting implement.

To make the cut, the technician can use a conventional cutting tool, such as a drill or a cutting disc, for example, and guide said cutting tool using the first planar face and the second face of the auxiliary part as a support. Good cutting precision is thereby achieved and the need for each dental prosthesis technician to implement a particular cutting system which can give different results depending on the technician's skills is prevented. Once cutting has been performed, the technician removes the auxiliary part as it can be detached from its coupling with the interface part.

Preferably, the first plane is perpendicular to the central axis. The pillar obtained after cutting therefore has an end face in a plane perpendicular to the central axis and a notch adjacent to this plane.

The second face can have any shape, depending on the geometry of the notch that must be made at the free end of the pillar of the interface part. For example, it can be a planar face in a plane other than the plane of the first face, it can have the shape of a right angle bracket with one of its sides parallel to the central axis, or it can have other complex shapes such as a curved shape or a combination of successive planar and/or curved shapes, for example.

In preferred embodiments, the second face comprises an upper segment in a second plane parallel to the central axis, and a lower segment in a third plane, said second plane and third planes intersecting with the final segment of the pillar, and said third plane forming with said second plane an angle equal to or greater than 90°. Preferably, said angle formed by the third plane and the second plane is an obtuse angle, and more preferably comprised between 110° and 130°. A notch in the form of an obtuse angle is therefore made in the pillar which provides better attachment of the prosthesis element on said pillar compared to a notch in the shape of a right angle bracket, as a result of the increase in the surface of the outer face of the pillar that must be attached to the prosthesis element.

Preferably, the second face comprises a concave curved intermediate segment joining said upper segment and said lower segment. As a result of this configuration, the notch in the form of an obtuse angle made in the pillar does not have an edge in the center of the obtuse angle which weakens the resistance of the interface part to fatigue.

Optionally, the assembly according to the invention comprises a tool for attaching the auxiliary part to the interface part, in the coupled position, so that it cannot move relatively to said interface part in the direction of the central axis, said tool comprising a rod which moves in a through hole of said auxiliary part and presses, with its end, the outer surface of said interface part. As a result of this solution, the technician does not have to maintain the coupled position of the two parts during the dental prosthesis cutting operation, so the pillar cutting operation is made even easier.

Preferably, the rod is provided with a thread and the through hole is provided with a corresponding thread, such that said rod is screwed into said through hole so that it moves along same until pressing, with its end, the outer surface of the interface part, and the tool comprises a handle integral with said rod. This configuration allows attaching the parts, so that they cannot move one relatively to the other, in a particularly easy and robust manner.

The invention also comprises other detailed features shown in the following detailed description of an embodiment of the invention and in the attached drawings.

BRIEF DESCRIPTION OF THE DRAWINGS

The advantages and features of the invention will become apparent in the following description in which preferred embodiments of the invention are described in a non-limiting manner with respect to the scope of the main claim in reference to the drawings.

FIGS. 1 to 5 are, respectively, a perspective view, a section view, a bottom view, a front view, and a top view of the interface part.

FIGS. 6 to 10 are, respectively, a perspective view, a section view, a bottom view, a front view, and a top view of the auxiliary part.

FIGS. 11 to 13 are, respectively, a front view, a longitudinal section view, and a cross-section view of the assembly formed by the interface part and the auxiliary part in the coupled position.

FIG. 14 shows from left to right successive steps of the pillar cutting operation for the interface part at a height predetermined by the auxiliary part.

FIG. 15 shows three auxiliary parts, each of them sized for cutting the same interface part at a different height.

FIGS. 16 and 17 are a perspective view and a section view showing the use of the tool for attaching the two parts to one another so that they cannot move one relatively to the other in the direction of the central axis.

FIGS. 18 to 30 show a second embodiment with a second type of interface part.

FIGS. 18 to 22 are, respectively, a perspective view, a section view, a bottom view, a front view, and a top view of the interface part.

FIGS. 23 to 28 are, respectively, a top perspective view, a bottom perspective view, a section view, a bottom view, a front view, and a top view of the auxiliary part.

FIGS. 29 and 30 are, respectively, a longitudinal section view and a cross-section view of the assembly formed by the interface part and the auxiliary part, coupled to one another and in the coupled position.

FIGS. 31 to 37 are, respectively, a perspective view, a first longitudinal section view, a second longitudinal section view, a cross-section view, a bottom view, a front view, and a top view of an auxiliary part according to a third embodiment.

DETAILED DESCRIPTION OF SEVERAL EMBODIMENTS OF THE INVENTION

Figure 1:
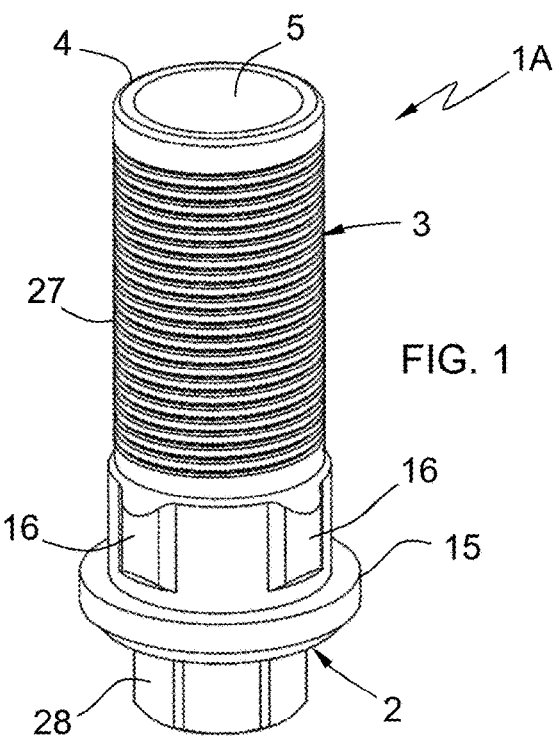
FIGS. 1 to 17 show a first embodiment with a first type of interface part.
Figure 2:
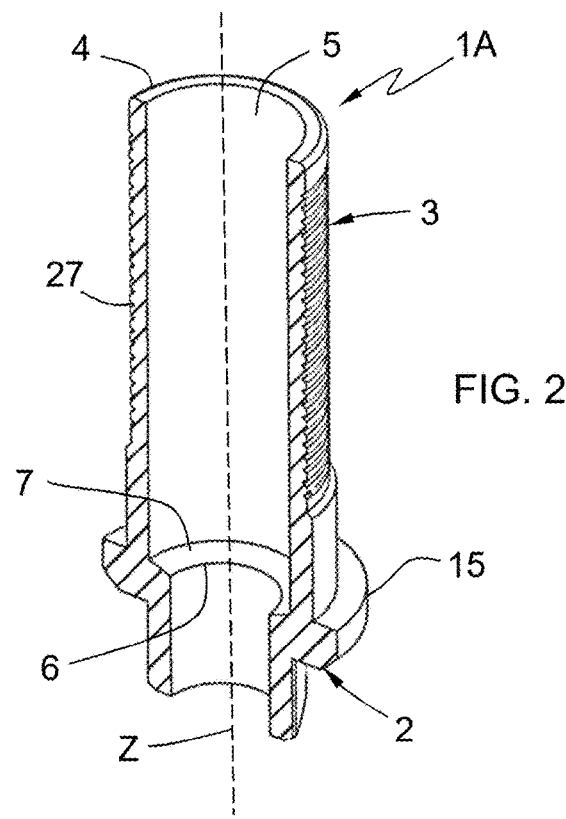
Figure 4:
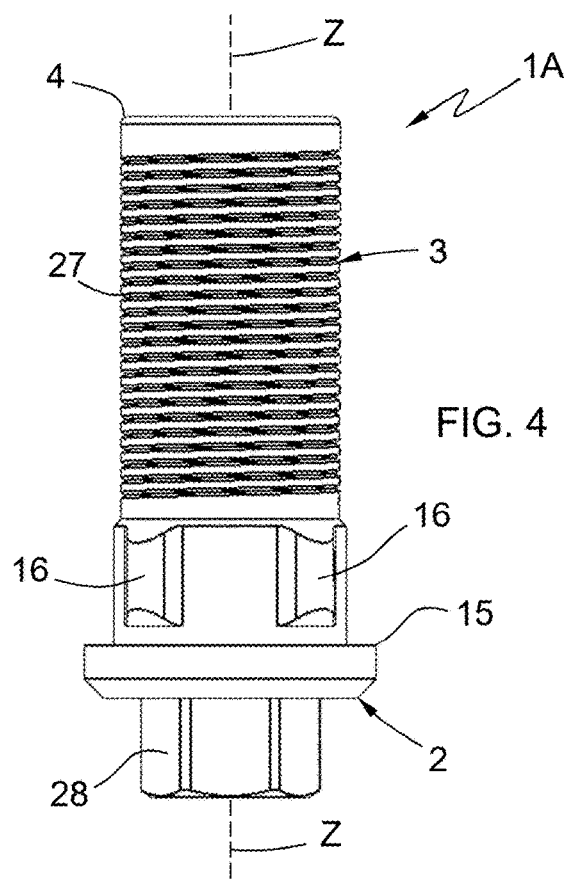
Figure 3:
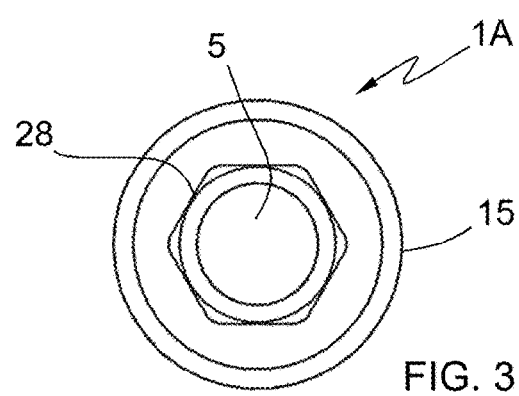
Figure 5:
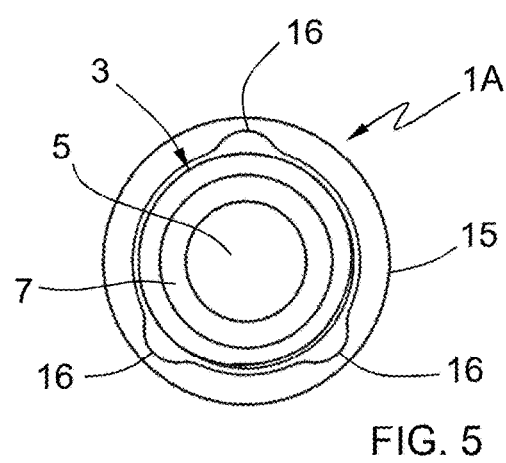
Figure 6:
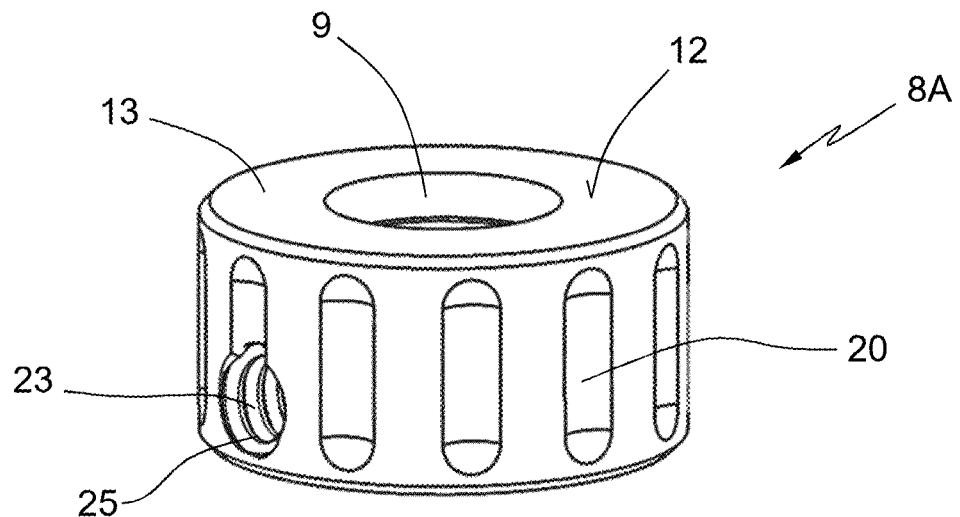
Figure 7:
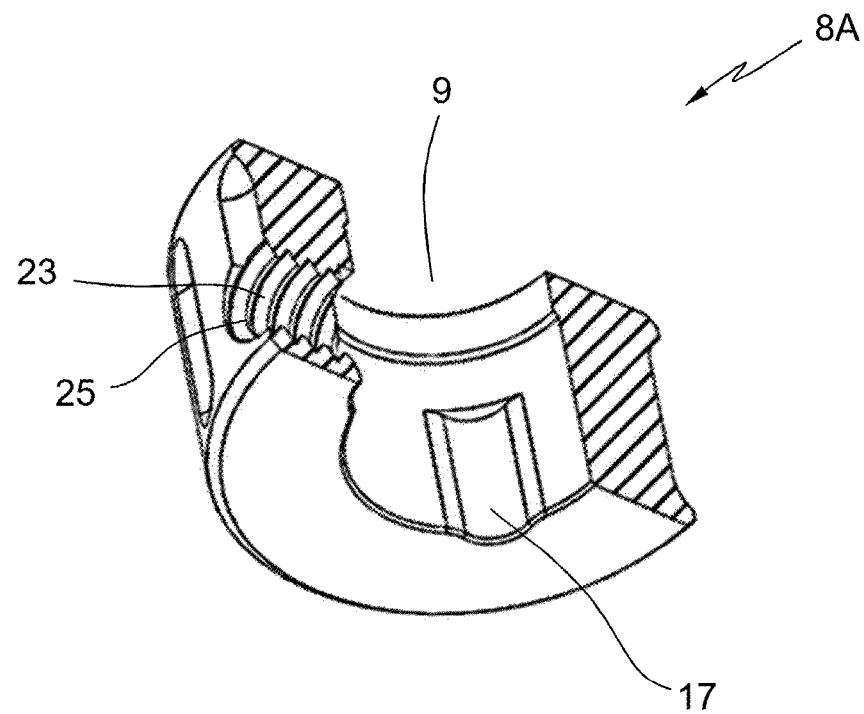
Figure 8:
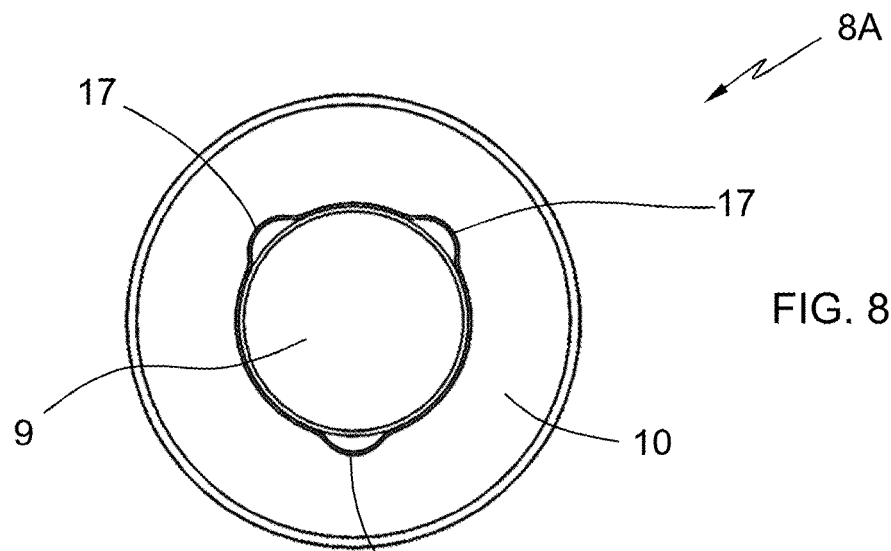
Figure 9:
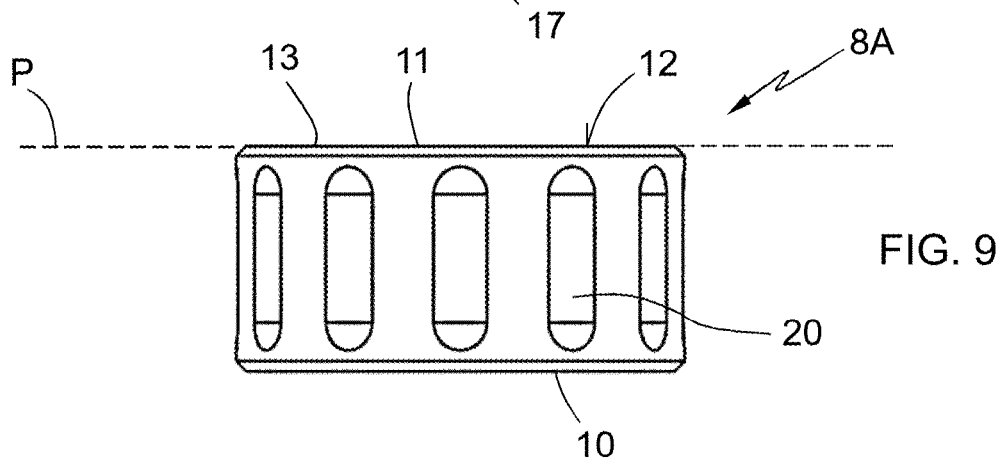
Figure 10:
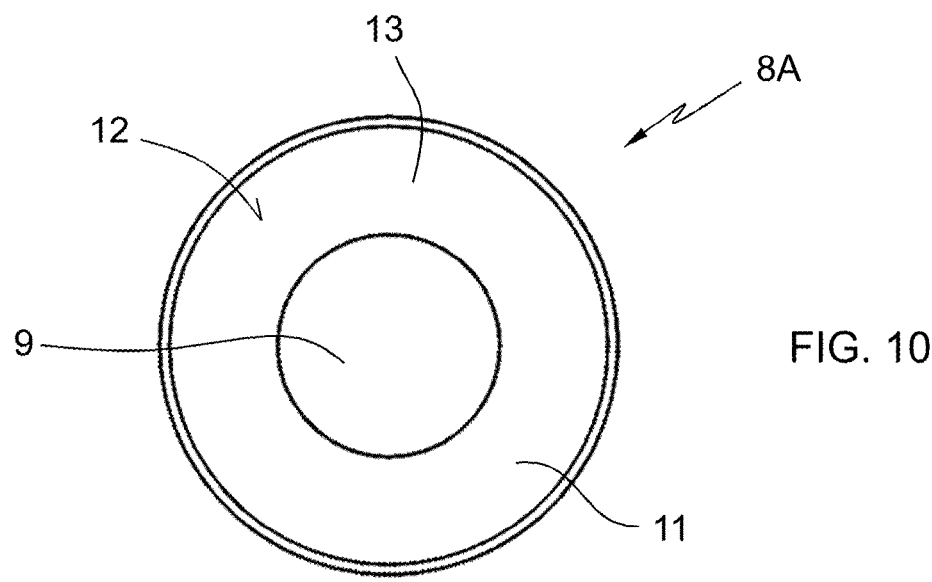

FIGS. 1 to 17 show a first embodiment of the assembly according to the invention, with a first type of interface part.

The assembly is formed by an interface part 1A for dental implants and three auxiliary parts 8A. In the embodiment that is shown, the three auxiliary parts 8A have the same shape but not the same height: each of them has a different height to enable cutting the pillar of the same interface part 1A at a different height. FIGS. 1-14 and 16-17 show only the auxiliary part 8A having a smaller height.

The interface part 1A is a one-piece metallic part made of biocompatible material, such as grade 5 titanium alloy (Ti-6Al-4V alloy), a Cr—Co alloy, or a Ni—Cr—Mo—Ti alloy, for example. As can be seen in FIGS. 1 to 5, the interface part 1A has a tubular shape with a central axis Z and comprises a base end 2 for seating the interface part 1A on a dental implant body (not depicted in the drawings), and a pillar 3 for integrally attaching a prosthesis element (not depicted in the drawings) to said interface part 1A. The pillar 3 is coaxial with the central axis Z and extends from the base end 2 to a free end 4 of said pillar 3. An inner conduit 5, coaxial with the central axis Z, goes through the interface part 1A from the free end 4 to the base end 2. This inner conduit 5 forms a passage for a set screw (not depicted in the drawings) and is provided with an inner rib 6 which forms a seating 7 for the head of the set screw. The base end 2 has a flange-like seating portion constituting a rim 15 protruding from the outer surface of the pillar 3 in a radial direction with respect to the central axis Z. The pillar 3 extends from the rim 15 to the free end 4. The base end 2 further comprises a fitting portion 28 which in the depicted example has a hexagonal shape and is intended for fitting the interface part 1A in a dental implant body having a corresponding shape in a manner that prevents rotation. This fitting portion 28 can have any other shape, including a shape on the inner surface of the inner conduit 5, depending on the geometry of the dental implant body in which the interface part 1A is to be fitted. The outer surface of the pillar 3 is cylindrical and comprises retaining grooves 27, intended for assuring the integral attachment of a prosthesis element to said outer surface of the pillar 3. In a lower segment of the pillar 3, adjacent to the base end, the outer surface of the pillar 3 comprises three protuberances 16 which are distributed around the central axis Z and form a non-circular outer surface of the pillar 3.

The auxiliary part 8A is a one-piece part made of any strong and rigid material. For example, it can be a metallic part or a part molded from a polymer material with fillers. As can be seen in FIGS. 6 to 10, in the depicted embodiment the auxiliary part 8A has an annular shape with an axial passage 9 going through said auxiliary part 8A from a lower end 10 to an upper end 11 thereof. In the drawings, the auxiliary part 8A has a cylindrical ring shape. The upper end 11 forms an annular peripheral surface 12 around the axial passage 9. This peripheral surface 12 comprises a planar face 13 in a plane P. In the depicted example, the entire peripheral surface 12 constitutes the planar face 13, which in this case is located on plane P parallel to the axis of the cylindrical ring-shaped auxiliary part 8A. Other embodiments in which the peripheral surface has a complex shape and only a part thereof constitutes the planar face are possible.

Figure 11:
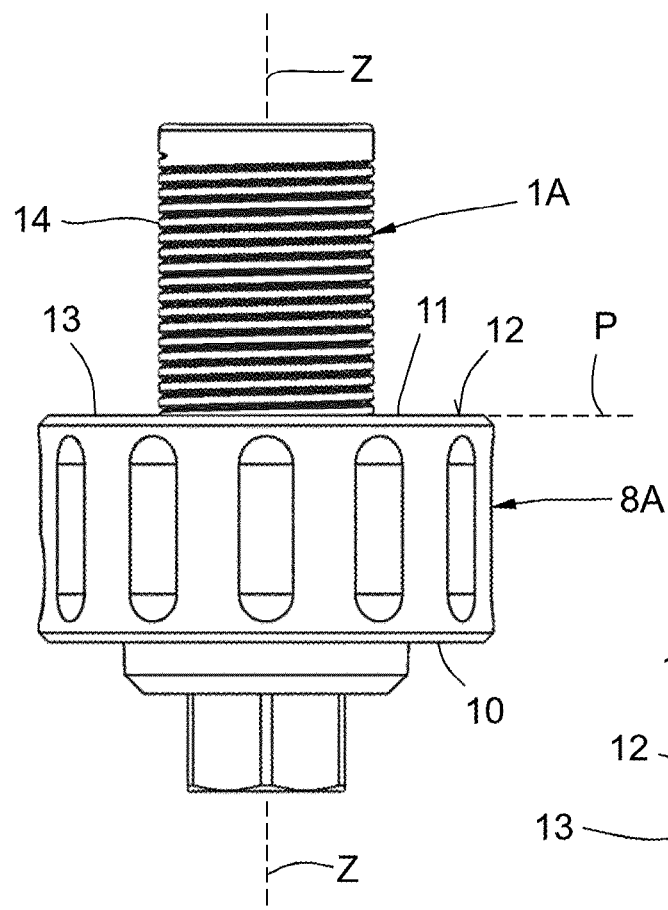
Figure 12:
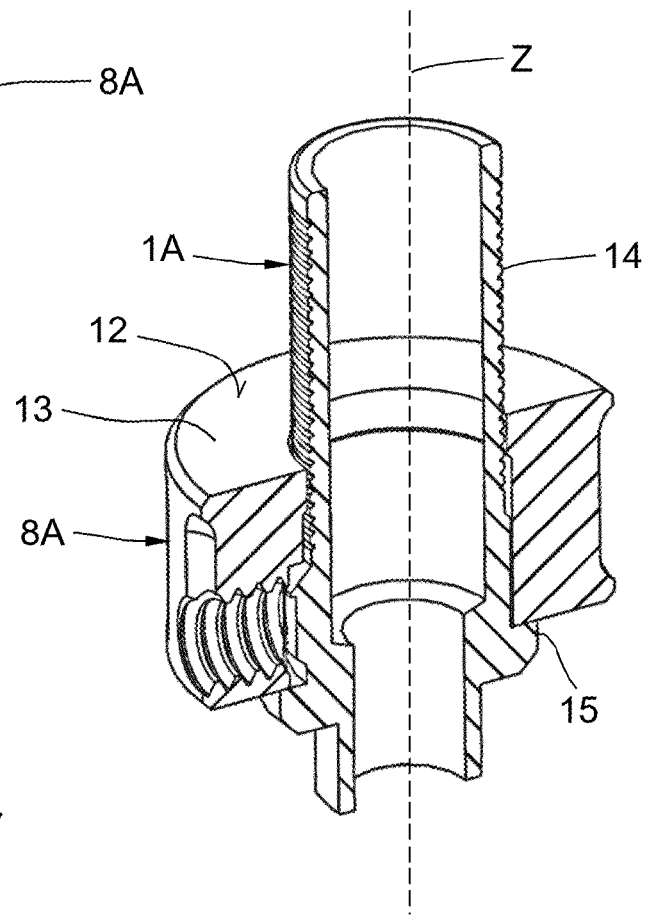
Figure 13:
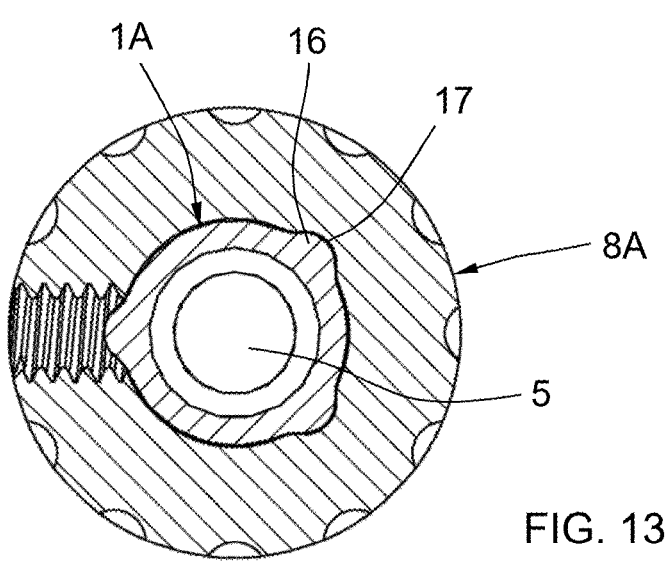

The auxiliary part 8A is formed for being coupled in a detachable manner to the interface part 1A, such that the pillar 3 enters the axial passage 9 of the auxiliary part 8A through the lower end 10 and moves freely in the direction of the central axis Z to a coupled position in which the auxiliary part 8A is supported abutting with interface part 1A. The assembly of the two parts 1A and 8A in this coupled position is shown in FIGS. 11 to 13. As can be seen in FIG. 12, the auxiliary part 8A is supported with its lower end 10 abutting with the rim 15 of the interface part 1A. This abutting support constitutes a limit for the relative movement between the pillar 3 and the axial passage 9 in the direction of entry of said pillar 3 in said axial passage 9. Therefore, in this coupled position the auxiliary part 8A is coupled to the interface part 1A so that it cannot move relatively to said interface part 1A in the direction of the central axis Z in said direction of entry. Furthermore, in this coupled position the interface part 1A is coupled to the auxiliary part 8A by shape complementarity between said interface part 1A and said auxiliary part 8A, so that it cannot move relatively to said auxiliary part 8A in any radial direction with respect to the central axis Z. More specifically, in the depicted embodiment the shape of the axial passage 9 and the shape of the pillar 3 are complementary in a section transverse to the central axis Z, as can be seen in FIG. 13. The inner surface of the axial passage 9 comprises three sinkages 17 in which each of the three protuberances 16 is introduced. These three sinkages 17 form a non-circular inner surface of the axial passage 9 with respect to the central axis Z, having a shape complementary to the shape of the non-circular outer surface of the pillar 3 formed by the protuberances 16. In that sense, in the coupled position the interface part 1A is coupled to the auxiliary part 8A by shape complementarity between the outer surface of the pillar 3 and the inner surface of the axial passage 9, so that so that said interface part 1A cannot rotate relatively to said auxiliary part 8A with respect to the central axis Z. In other embodiments, this attachment can be made with different numbers of protuberances 16 and sinkages 17, without there being a need for as many sinkages 17 as protuberances 16.

As can be seen in particular in FIG. 11, in the coupled position the pillar 3 protrudes through the upper end 11 of the auxiliary part 8A in a final segment 14 adjacent to the free end 4, such that the plane P of the planar face 13 intersects with said final segment 14 of the pillar 3 and the central axis Z. The section of plane P with the pillar 3 determines the plane along which said pillar 3 will be cut with the help of the auxiliary part 8A.

Figure 14:
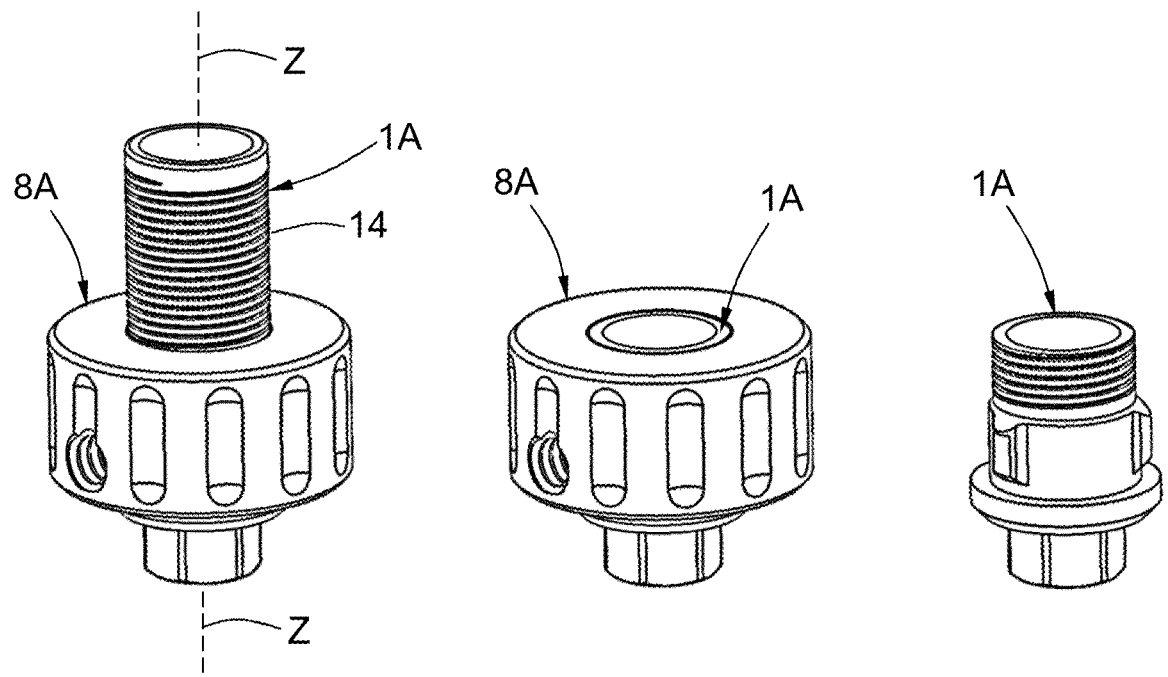
Figure 15:
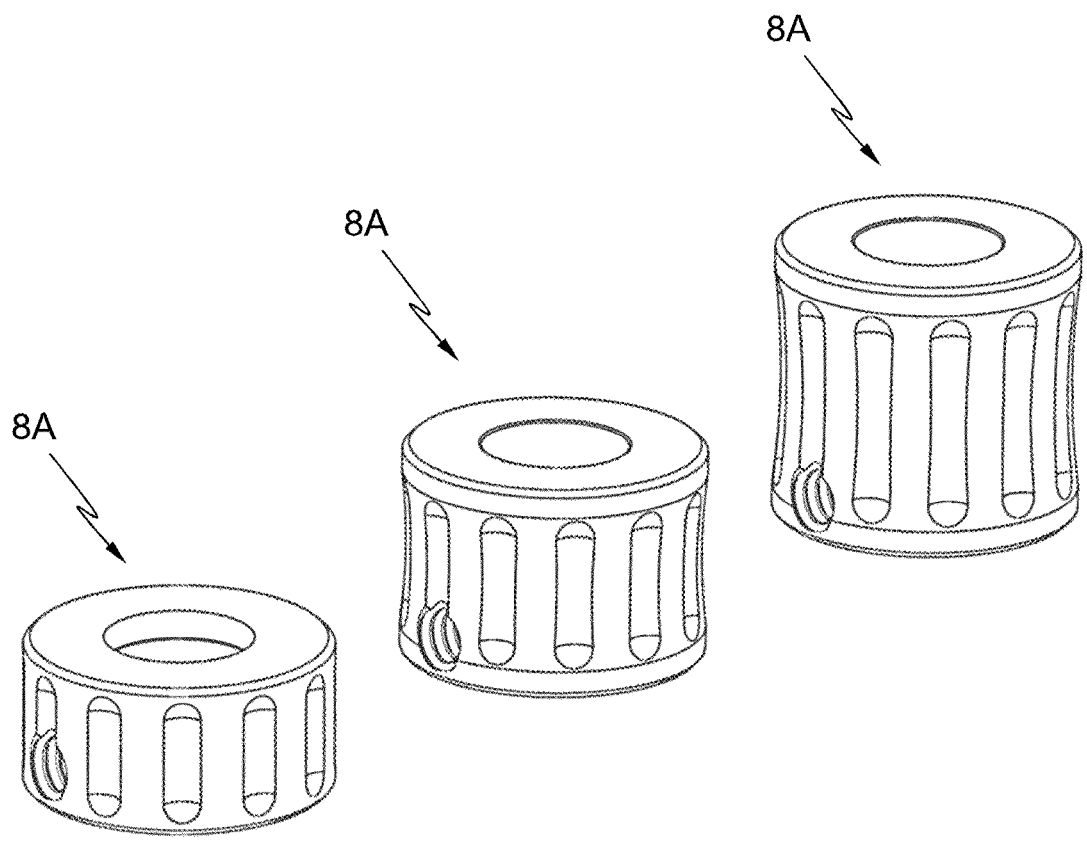

To cut the pillar 3, a dental prosthesis technician works in the following manner. First, the technician chooses the auxiliary part 8A which corresponds to the desired cutting height from among the different auxiliary parts 8A available, for example from among the three parts shown in FIG. 15. Next, the technician couples the auxiliary part 8A to the interface part 1A, introducing the pillar 3 through the axial passage 9 and moving the auxiliary part 8A with respect to the interface part 1A along the central axis Z until reaching the coupled position shown in FIGS. 11 to 13. This situation is shown in the image on the left hand side of FIG. 14. The technician then uses a cutting tool, such as a drill or a cutting disc, for example, to cut the pillar 3 along the plane Z defined by the planar face 13. To that end, the technician can advantageously support the cutting tool on the planar face 13. The image in the center of FIG. 14 shows the situation after cutting has been performed. Finally, the technician removes the auxiliary part 8A, and thereby obtains the interface part 1A with the pillar 3 cut to the desired height as shown in the image on the right hand side of FIG. 14.

To cut the pillar 3 at a different height, the technician performs the same operation using another auxiliary part 8A. Each of the auxiliary parts 8A is sized such that, when it is coupled to the same interface part 1A and in the coupled position, the plane P of the planar face 13 intersects with the final segment 14 of the pillar 3 and the central axis Z at a different height along the central axis Z. In the depicted embodiment, this is achieved simply as a result of the auxiliary parts 8A having the same shape but a different height between the lower end 10 and the upper end 11.

The auxiliary part 8A has a cylindrical-shaped outer surface provided with grooves 20 distributed along the circular perimeter of said cylindrical shape. The outer surface of the auxiliary part 8A thereby forms a grip which the technician can use to hold said auxiliary part 8A and keep it in the coupled position while the cut is being made.

FIGS. 18 to 30 show a second embodiment of the assembly according to the invention, with a second type of interface part. The same reference numbers as in the first embodiment have been used in the drawings to indicate similar elements.

The interface part 1B is depicted in FIGS. 18 to 22. It differs from interface part 1A in that the outer surface of the pillar 3 has a frustoconical shape centered in the central axis Z, with a diameter that decreases towards the free end 4. Furthermore, the non-circular outer surface of the pillar 3 is not formed by protuberances, but rather by three recesses 18 distributed around the central axis Z. The recesses 18 are formed in a central area of the pillar 3 which is provided with retaining grooves 27. The fitting portion of the base end 2 is also different. In this case, the fitting portion 29 is a body of revolution which, in the depicted example, has a frustoconical shape and is intended for rotatably fitting the interface part 1B in a dental implant body having a corresponding shape. This fitting portion 29 can have any other shape, including a shape on the inner surface of the inner conduit 5, depending on the geometry of the dental implant body in which the interface part 1B is to be fitted.

The auxiliary part 8B is depicted in FIGS. 23 to 28. If differs from auxiliary part 8A in that the inner surface of the axial passage 9 comprises two ribs 19 forming the non-circular inner surface of the axial passage 9 and in that, in the coupled position, each of them is introduced in one of the recesses 18. In the depicted embodiment, the recesses 18 are sunken planar faces, and the ribs 19 are corresponding protruding planar faces. The axial passage 9 has a segment with a frustoconical shape complementary to the frustoconical shape of the outer wall of the pillar 3. The shape of the axial passage 9 and the shape of the pillar 3 are therefore complementary in a section transverse to the central axis Z, as can be seen in FIG. 30.

Figure 29:
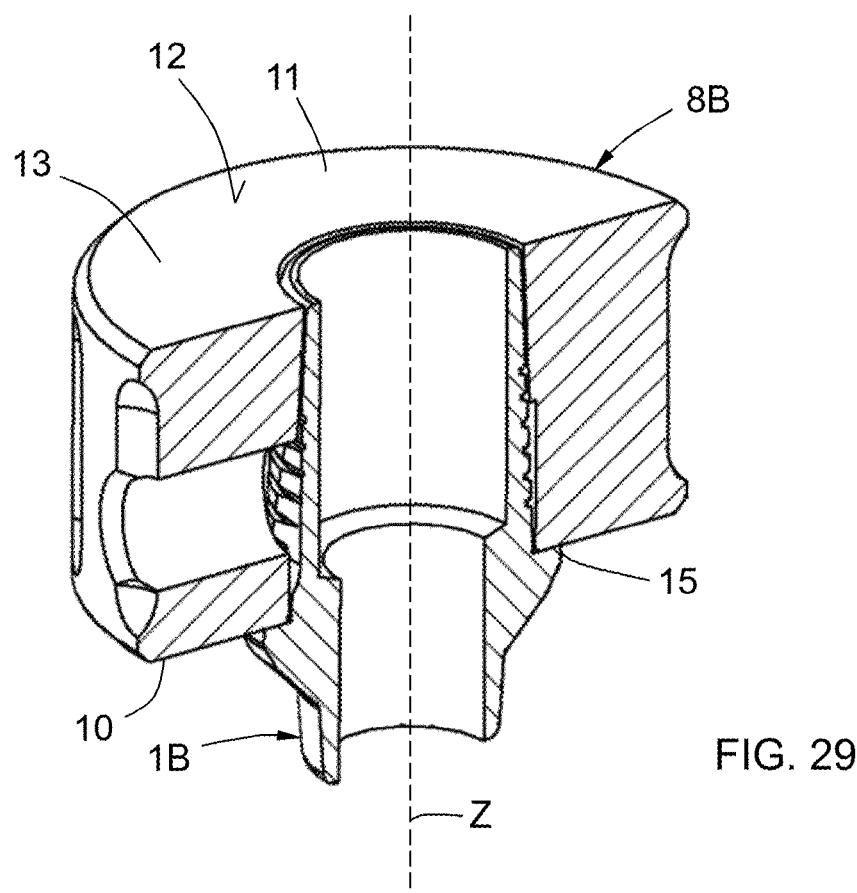
Figure 30:
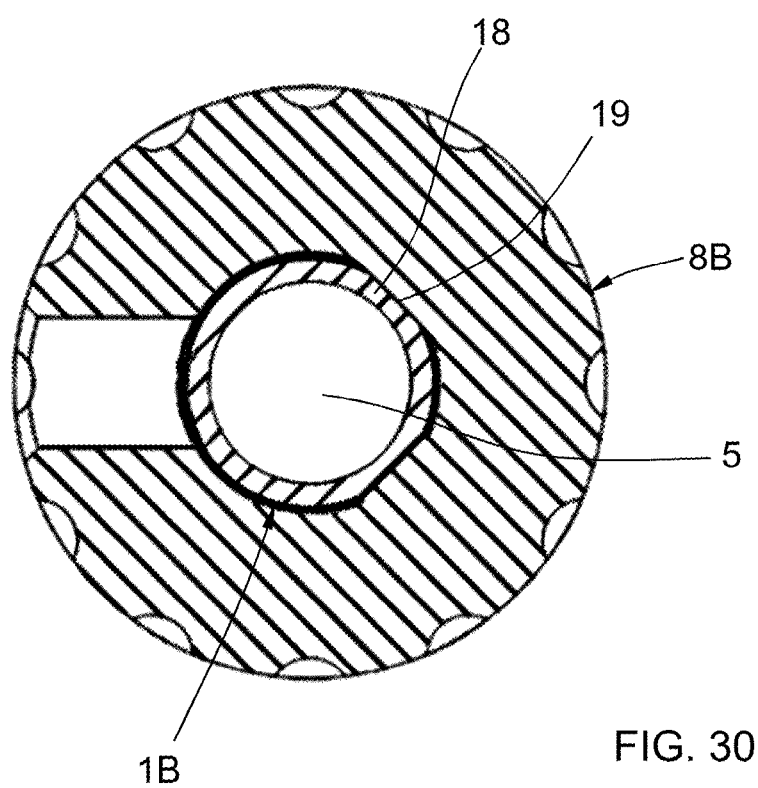
Figure 35:
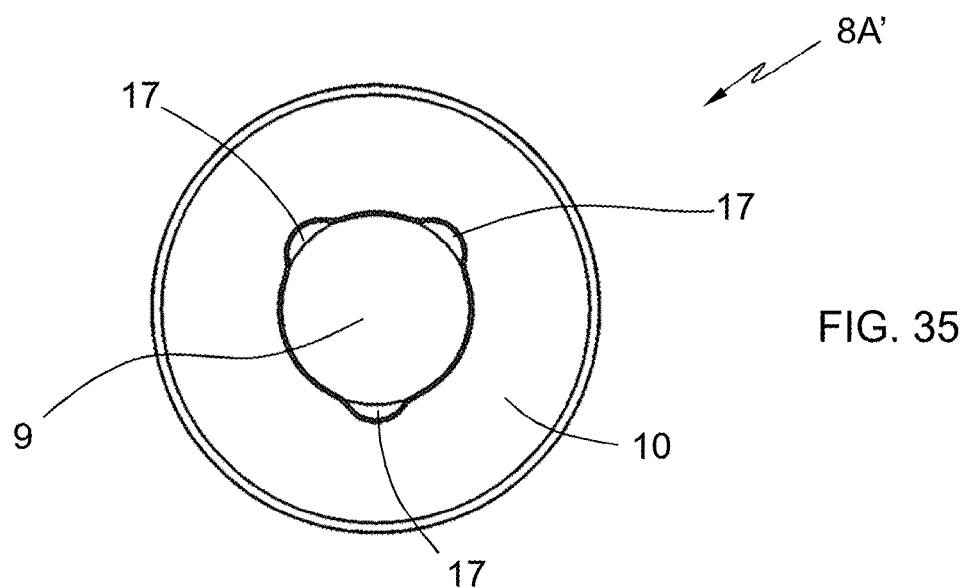
Figure 36:
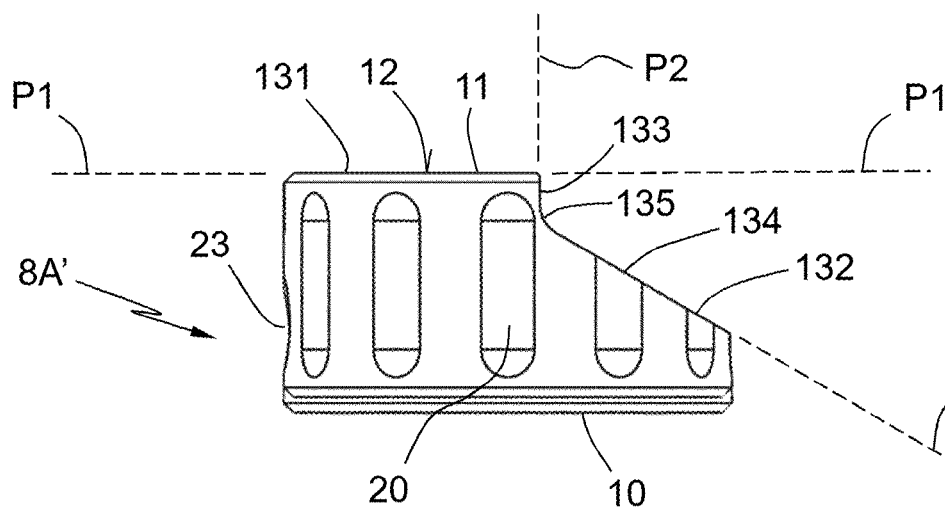
Figure 37:
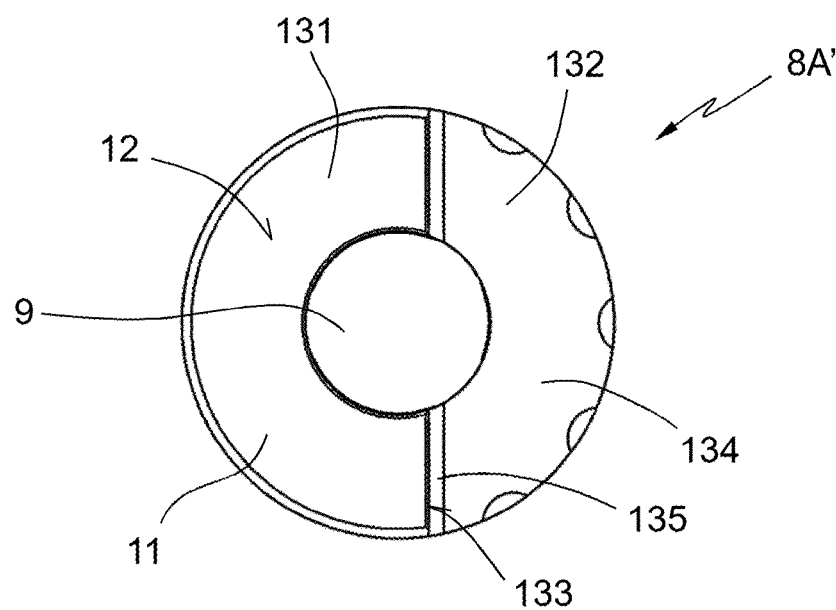

FIGS. 29 and 30 show the fitting of the two parts 1B and 8B. It can be observed that FIG. 29 depicts the part 1B after the pillar 3 has been cut. The initial situation before cutting and in the coupled position is similar to that of FIG. 11, i.e., the pillar 3 protrudes through the upper end 11 of the auxiliary part 8B in a final segment adjacent to the free end 4, such that the plane P of the planar face 13 intersects with said final segment of the pillar 3 and the central axis Z.

FIGS. 31 to 44 show a third embodiment of the assembly according to the invention. The assembly is formed by an interface part 1A for dental implants which in this example is identical to the one of the first embodiment shown in FIGS. 1 to 17, and an auxiliary part 8A' according to said third embodiment.

The auxiliary part 8A' is a one-piece part made of any strong and rigid material. For example, it can be a metallic part or a part molded from a polymer material with fillers. As can be seen in FIGS. 31 to 37, in the depicted embodiment the auxiliary part 8A' has an annular shape with an axial passage 9 going through said auxiliary part 8A' from a lower end 10 to an upper end 11 thereof. In the drawings, the auxiliary part 8A' has a cylindrical ring shape. The upper end 11 forms an annular peripheral surface 12 around the axial passage 9. This peripheral surface 12 comprises a first planar face 131 in a first plane P1 perpendicular to the axis of the cylindrical ring-shaped auxiliary part 8A' and a second face 132 that does not belong to said first plane P1 and continuously prolongs said first planar face 131 in said peripheral surface 12. The second face 132 comprises an upper segment 133 in a second plane P2 parallel to the axis of the cylindrical ring-shaped auxiliary part 8A' and a lower segment 134 in a third plane P3 forming with said second plane P2 an obtuse angle comprised between 110° and 130°. In the example depicted in the drawings, this angle is substantially equal to 120°. The second face 132 further comprises an elbow-like concave curved intermediate segment 135 joining the upper segment 133 and the lower segment 134.

Figure 38:
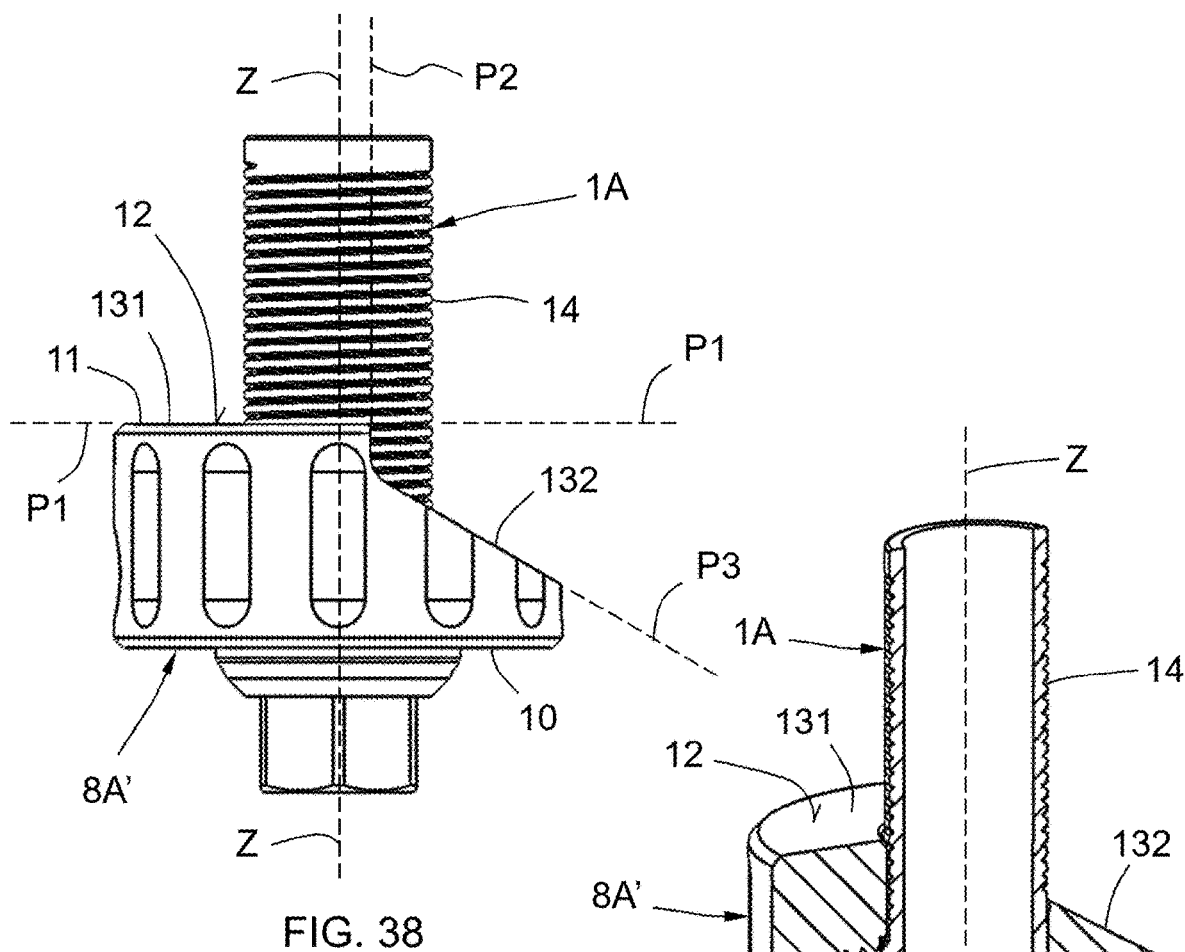
FIGS. 38 to 40 are, respectively, a front view, a longitudinal section view, and a cross-section view of the assembly formed by the interface part and the auxiliary part in the coupled position.
Figure 39:
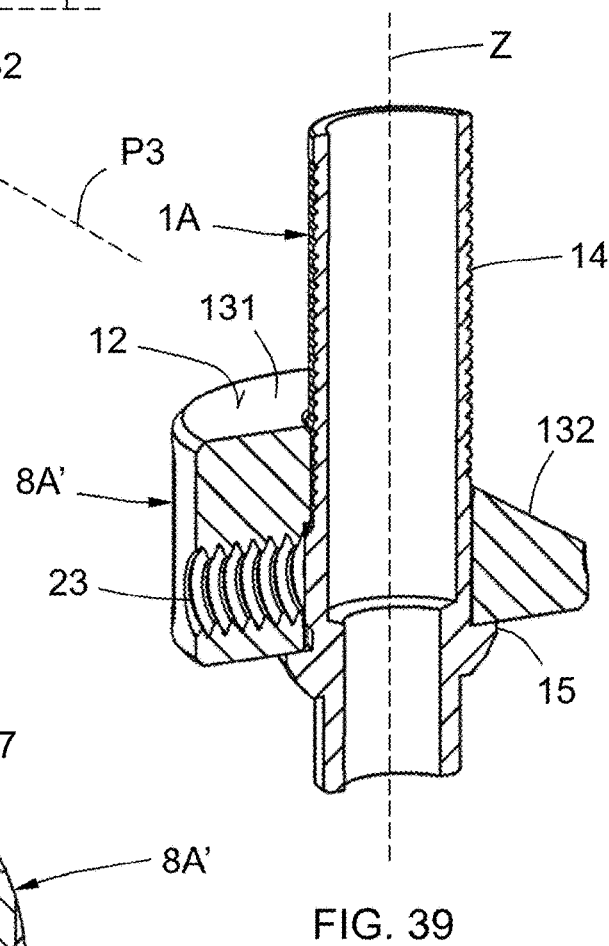
Figure 40:
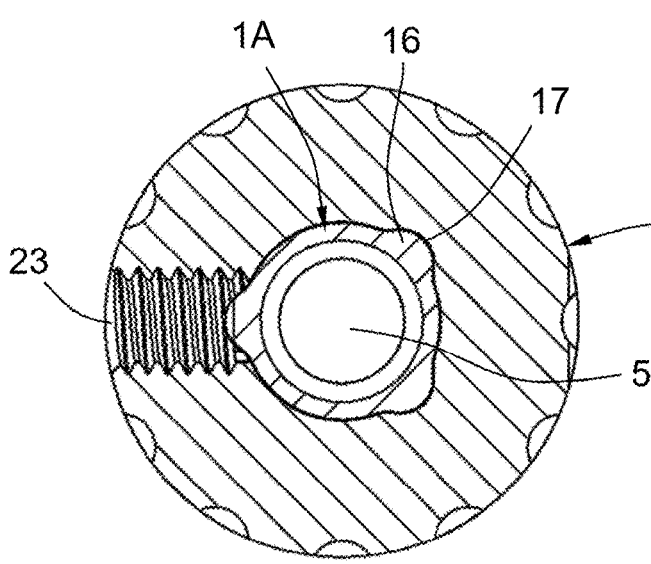

The auxiliary part 8A' is formed for being coupled in a detachable manner to the interface part 1A, such that the pillar 3 enters the axial passage 9 of the auxiliary part 8A' through the lower end 10 and moves freely in the direction of the central axis Z to a coupled position in which the auxiliary part 8A' is supported abutting with the interface part 1A. The assembly of the two parts 1A and 8A' in this coupled position is shown in FIGS. 38 to 40. As can be seen in FIG. 39, the auxiliary part 8A' is supported with its lower end 10 abutting with the rim 15 of the interface part 1A. This abutting support constitutes a limit for the relative movement between the pillar 3 and the auxiliary part 8A' in the direction of entry of said pillar 3 in the axial passage 9. Therefore, in this coupled position the auxiliary part 8A' is coupled to the interface part 1A so that it cannot move relatively to said interface part 1A in the direction of the central axis Z in said direction of entry. Furthermore, in this coupled position the interface part 1A is coupled to the auxiliary part 8A' by shape complementarity between said interface part 1A and said auxiliary part 8A', so that it cannot move relatively to said auxiliary part 8A' in any radial direction with respect to the central axis Z. More specifically, in the depicted embodiment the shape of the axial passage 9 and the shape of the pillar 3 are complementary in a section transverse to the central axis Z, as can be seen in FIG. 40. The inner surface of the axial passage 9 comprises three sinkages 17 in which each of the three protuberances 16 is introduced. These three sinkages 17 form a non-circular inner surface of the axial passage 9 with respect to the central axis Z, having a shape complementary to the shape of the non-circular outer surface of the pillar 3 formed by the protuberances 16. In that sense, in the coupled position the interface part 1A is coupled to the auxiliary part 8A' by shape complementarity between the outer surface of the pillar 3 and the inner surface of the axial passage 9, so that said interface part 1A cannot rotate relatively to said auxiliary part 8A' with respect to the central axis Z. In other embodiments, this coupling with no relative movement can be made with different numbers of protuberances 16 and sinkages 17, without there being a need for as many sinkages 17 as protuberances 16.

As can be seen in particular in FIG. 38, in the coupled position the pillar 3 protrudes through the upper end 11 of the auxiliary part 8A' in a final segment 14 adjacent to the free end 4, such that the first plane P1 of the first planar face 131 is perpendicular to the central axis Z and intersects with said final segment 14 of the pillar 3 and said central axis Z. The section of the pillar 3 along the first plane P1 determines a first cutting surface along which a first cut of said pillar 3 will be made with the help of the auxiliary part 8A' to reduce the height of said pillar 3 to a height established by the position of the first planar face 131 along the central axis Z. As can also be seen in FIG. 38, the second plane P2 of the second face 132 is parallel to said central axis Z, and the second plane P2 and the third plane P3 intersect with the final segment 14 of the pillar 3. The projection of the second face 132 over the pillar 3 determines a second cutting surface along which the pillar 3 will be cut with the help of the auxiliary part 8A' to make a notch 29 with a shape determined by said second face 132 of the auxiliary part 8A' in said pillar 3.

Figure 41:
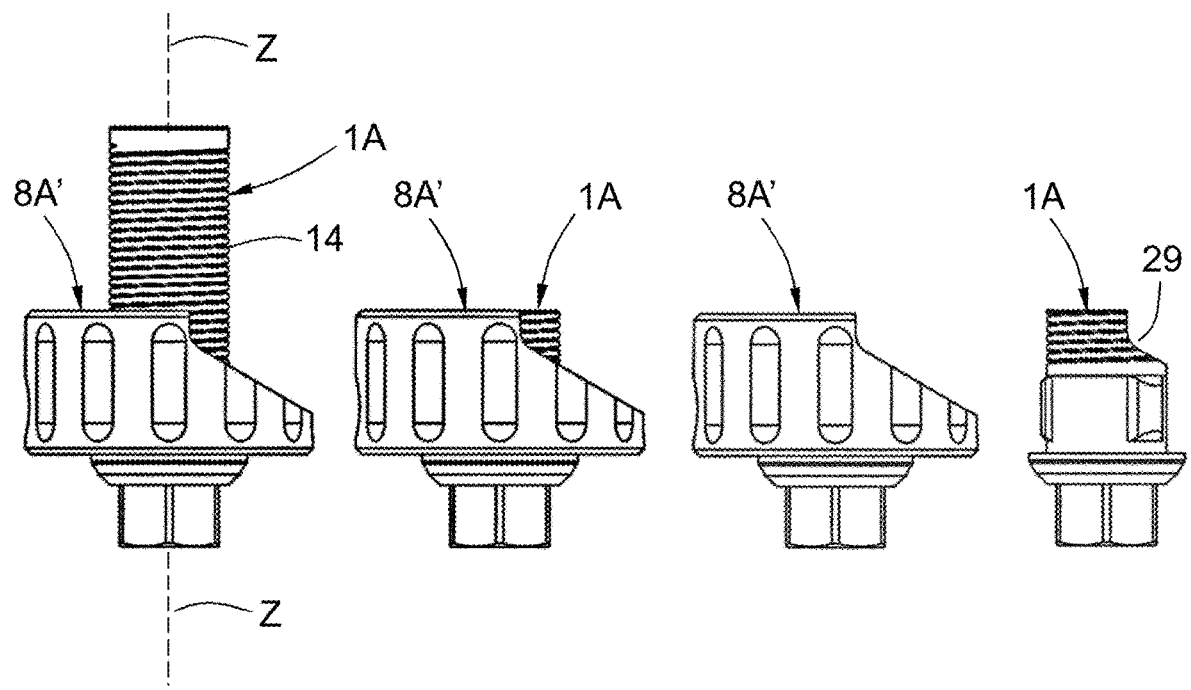
FIGS. 41 and 42 show from left to right successive steps of the pillar cutting operation for the interface part at a height predetermined by the auxiliary part with a notch being made in the pillar.
Figure 42:
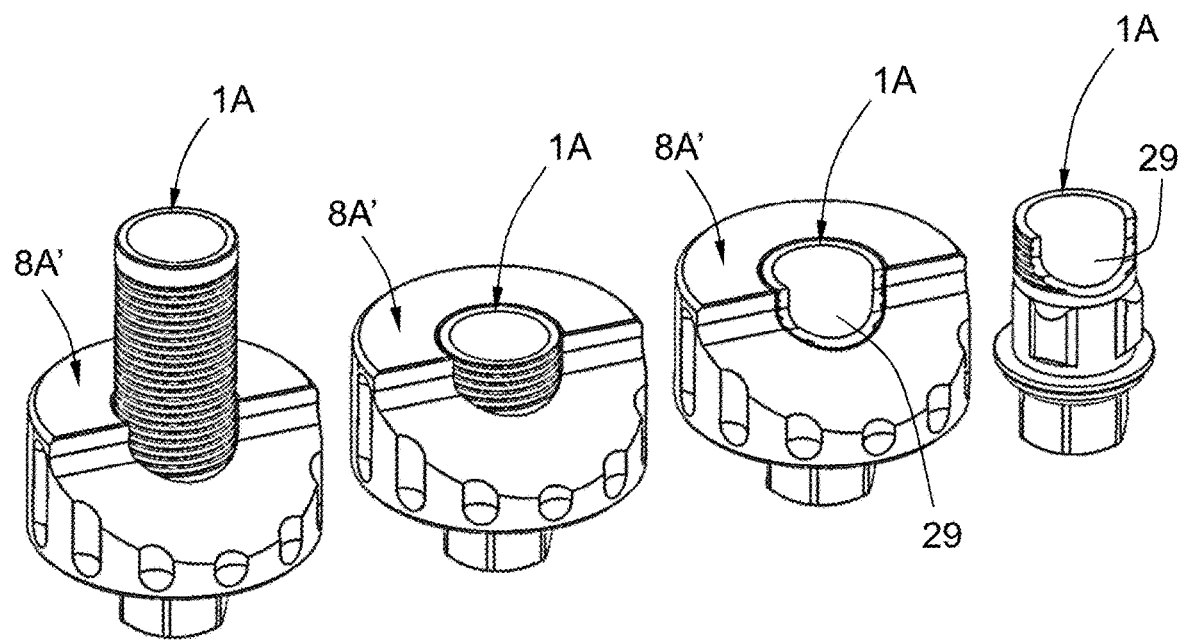

To cut the pillar 3, a dental prosthesis technician works in the following manner. First, the technician couples the auxiliary part 8A' to the interface part 1A, introducing the pillar 3 through the axial passage 9 and moving the auxiliary part 8A' with respect to the interface part 1A along the central axis Z until reaching the coupled position shown in FIGS. 38 to 40. This situation is shown in the first image on the left hand side of FIGS. 41 and 42. Next, the technician uses a cutting tool, such as a drill or a cutting disc, for example, to make a first cut on the pillar 3 along the first plane Z1 defined by the first planar face 131. To that end, the technician can advantageously support the cutting implement on said first planar face 131. The second image on left hand side of FIGS. 41 and 42 shows the situation after this first cut has been made, whereby the height of the pillar 3 has been reduced to a height established by the position of the first planar face 131 along the central axis Z. The technician then uses the same or another cutting tool, such as a drill, for example, to make a second cut on the pillar 3 following the projection of the second face 132. To that end, the technician can advantageously support the cutting implement on said second face 132. The third image on the left hand side of FIGS. 41 and 42 shows the situation after this second cut has been made, whereby a notch 29 with a shape determined by the second face 132 of the auxiliary part 8A' has been made in the pillar 3.

Finally, the technician removes the auxiliary part 8A', and thereby obtains the interface part 1A with the pillar 3 cut to the desired height and provided with the notch 29, as shown in the image on the right hand side of FIGS. 41 and 42.

Figure 16:
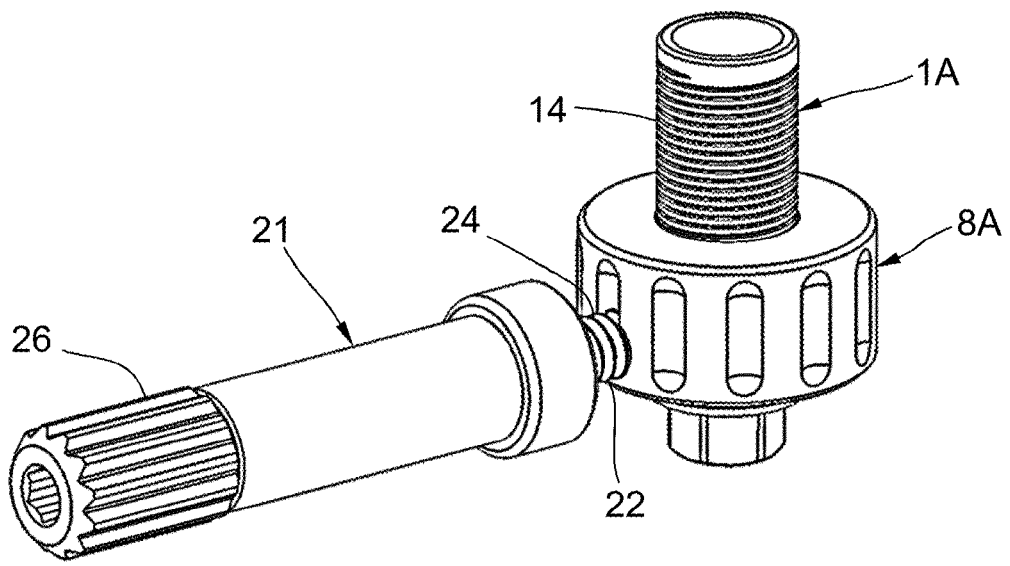
Figure 17:
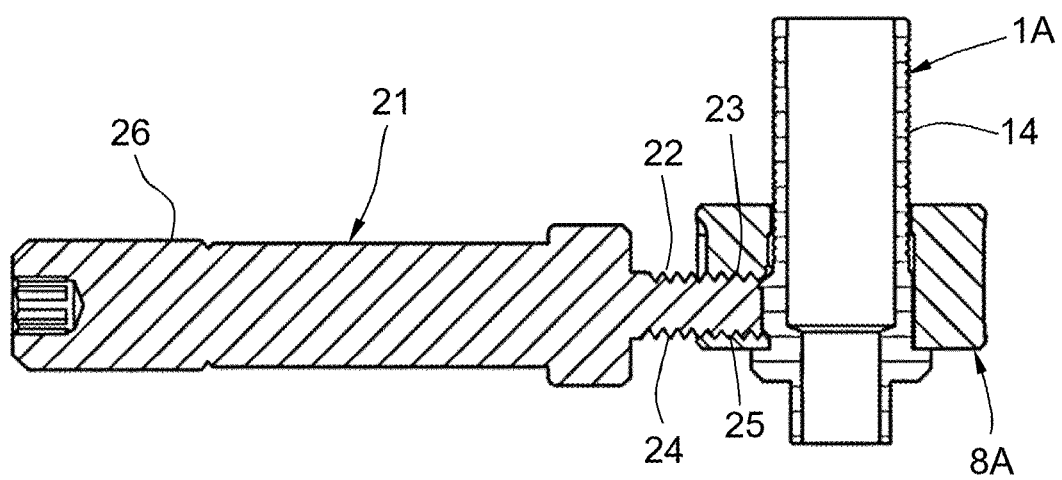
Figure 23:
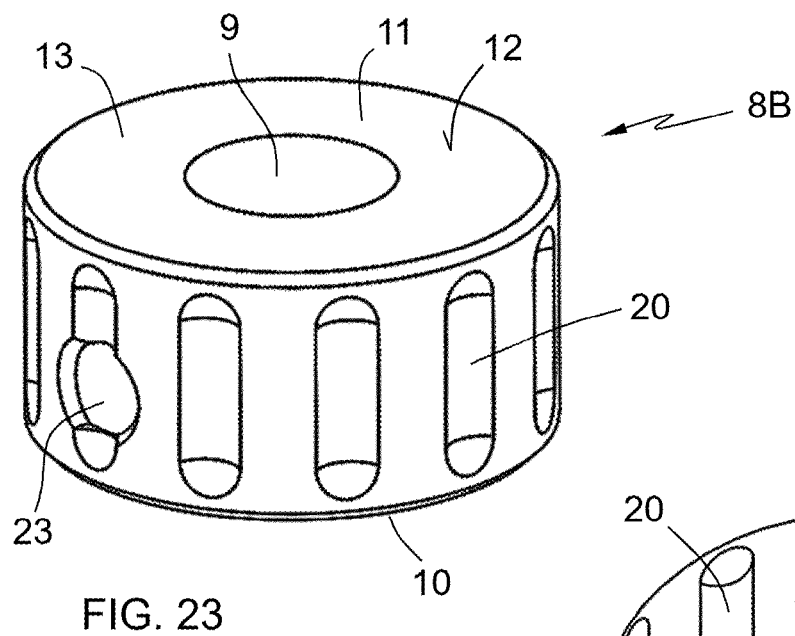
Figure 24:
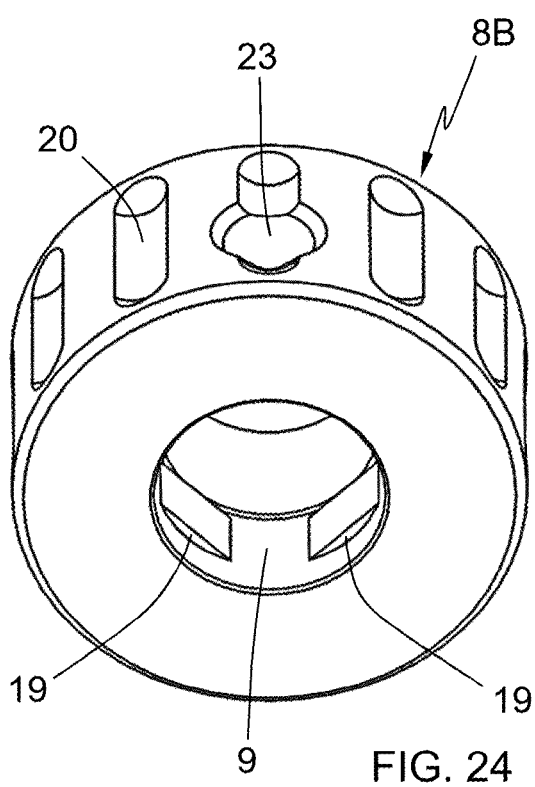
Figure 25:
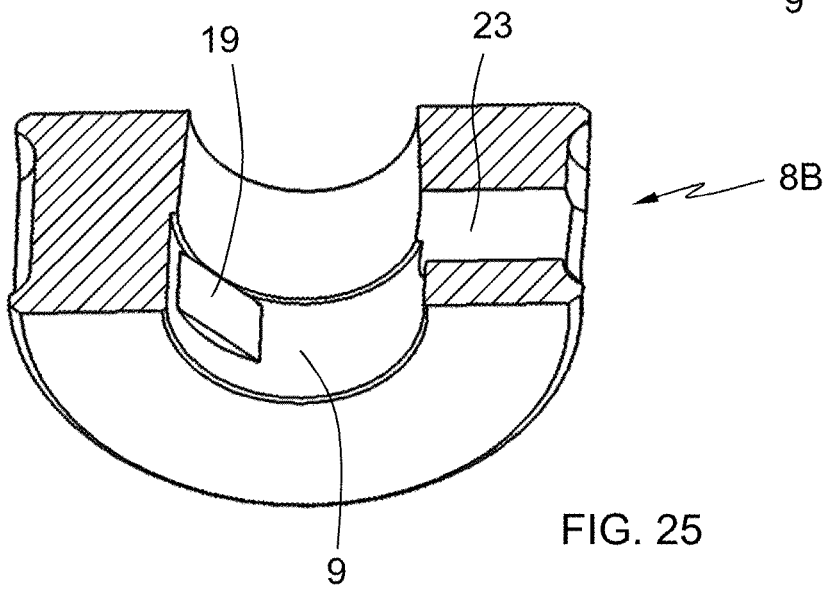
Figure 26:
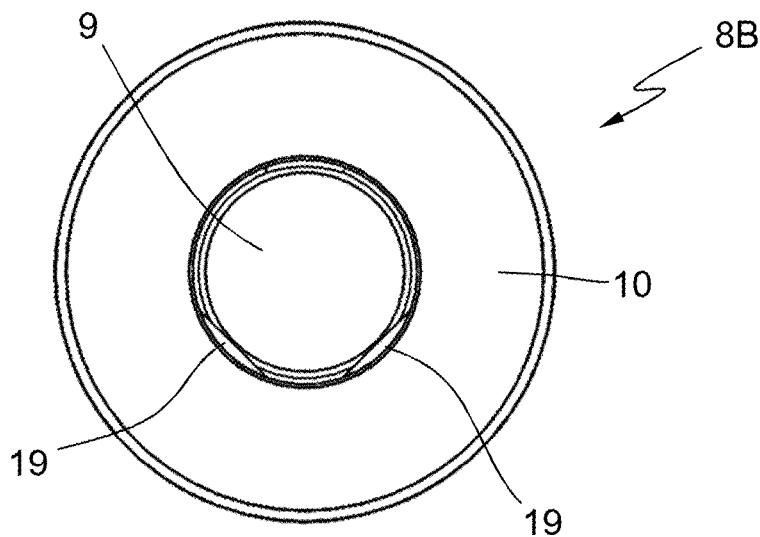
Figure 27:
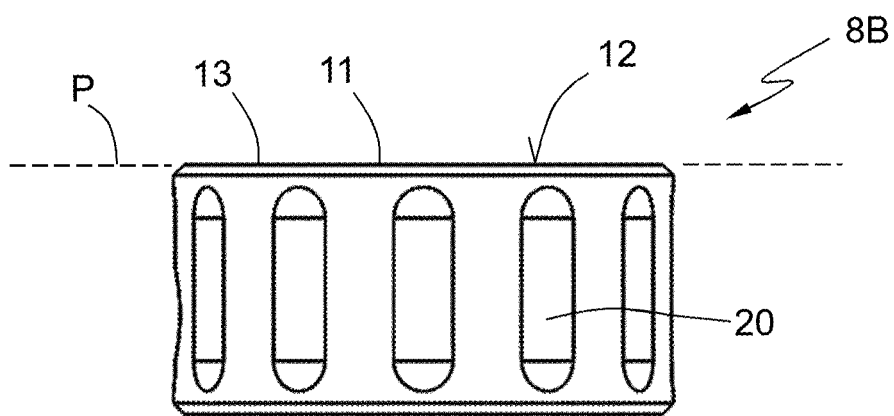
Figure 28:
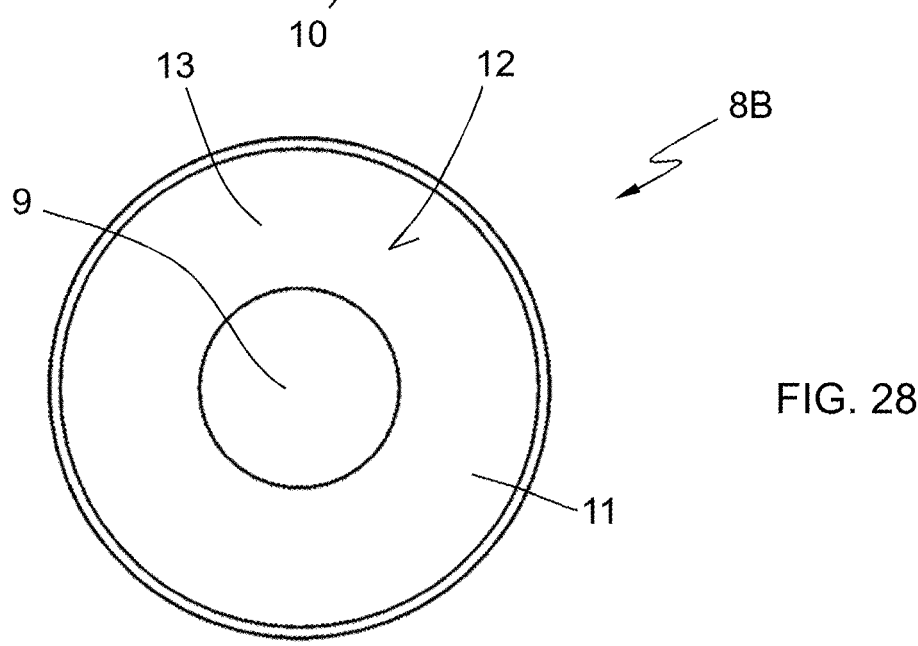
Figure 43:
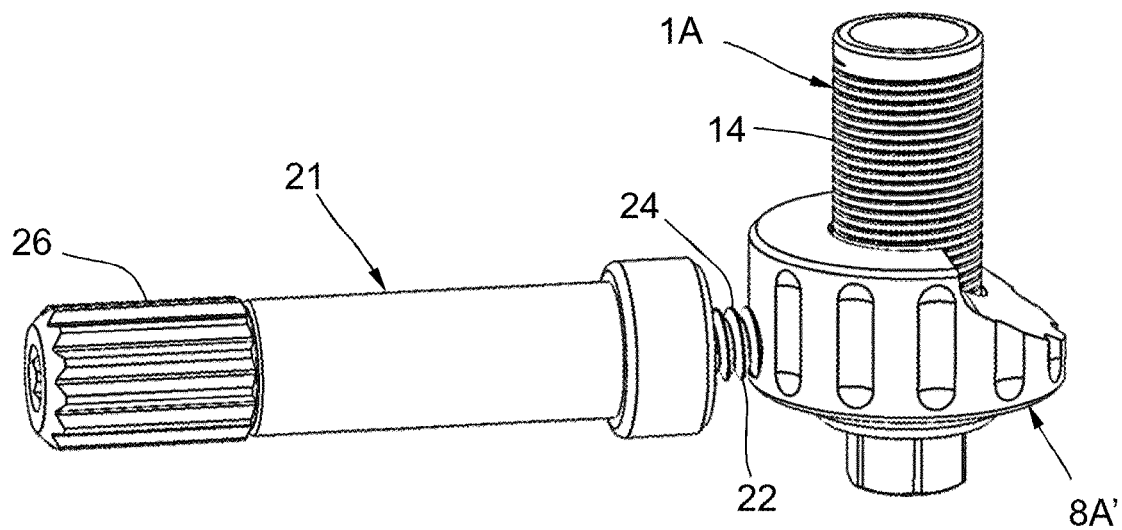
FIGS. 43 and 44 are a perspective view and a section view showing the use of the tool for attaching the two parts to one another so that they cannot move one relatively to the other in the direction of the central axis.
Figure 44:
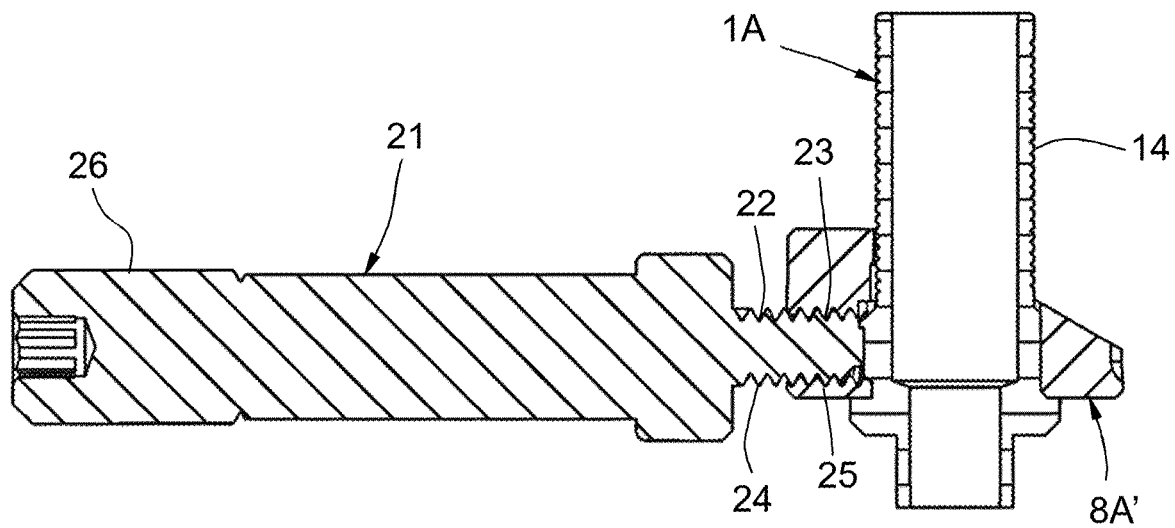

As shown in FIGS. 16 and 17 for the first embodiment, as well as in FIGS. 43 and 44 for the second embodiment, the assembly according to the invention may optionally comprise a tool 21 for keeping the two parts 1A, 8A-8A' in the coupled position, i.e., for attaching the auxiliary part 8A-8A' to the interface part 1A so that it cannot move relatively to said auxiliary part 8A-8A' in the direction of the central axis Z. The drawings show an embodiment of this tool 21, comprising a rod 22 which moves in a through hole 23 provided in the auxiliary part 8A-8A'. The rod 22 presses with its end the outer surface of the interface part 1A. Advantageously, the rod 22 is provided with a thread 24 and the through hole 23 is provided with a corresponding thread 25, such that the rod 22 is screwed into the through hole 23 and thereby moves in controlled manner along this through hole until pressing, with its end, the outer surface of the interface part 1A. The technician can readily rotate the rod 22 as a result of a handle 26 of the tool 21 which is integral with said rod 22. The rod 22 is kept in position, assuring the integral attachment of the two parts 1A, 8A-8A', so that they cannot move one relatively to the other, as a result of the force exerted through the end thereof on the interface part 1A.

The invention claimed is:

1. An assembly for forming an interface part with variable height for a dental implant, said dental implant comprising a dental implant body implanted in a bone, a dental prosthesis fixed to said dental implant body and said interface part interposed between said prosthesis element and said dental implant body, wherein said assembly comprises:
   an interface part having a tubular shape with a central axis and comprising: a base end for seating said interface part on a dental implant body, a pillar for integrally attaching a prosthesis element to said interface part, said pillar being coaxial with said central axis and extending from said base end to a free end of said pillar, and an inner conduit coaxial with said central axis going through said interface part from said free end to said base end forming a passage for a set screw, said inner conduit being provided with an inner rib which forms a seating for a head of the set screw,
   at least one auxiliary part formed for being coupled in a detachable manner to said interface part, such that in a coupled position: said auxiliary part is coupled to said interface part so that it cannot move relatively to said interface part at least in a direction parallel to said central axis; a final segment of said pillar, adjacent to said free end, protrudes through an upper end of said auxiliary part; said upper end of the auxiliary part forms a peripheral surface outside said pillar, said peripheral surface comprising at least one planar face in a plane; and said plane of the planar face intersects with said final segment of the pillar and said central axis; so that said plane defined by said planar face is a cutting plane for cutting said pillar with a cutting tool along said plane at a specific height which is predetermined by the actual dimensions of said auxiliary part, thereby enabling to modify the height of said interface part; wherein said auxiliary part is configured to be removed from said interface part prior to formation of said dental implant, and
   a tool for attaching said auxiliary part to said interface part in said coupled position, so that said auxiliary part cannot move relatively to said interface part in the direction of said central axis, said tool comprising a rod which moves in a through hole of said auxiliary part and presses, with its end, the outer surface of said interface part.

2. The assembly according to claim 1, wherein said rod is provided with a thread and said through hole is provided with a corresponding thread, such that said rod is screwed into said through hole so that said rod moves along said through hole until pressing, with its end, the outer surface of said interface part, and said tool comprises a handle integral with said rod.

* * * * *